(12) United States Patent
Sato et al.

(10) Patent No.: US 11,796,936 B2
(45) Date of Patent: Oct. 24, 2023

(54) LIGHT SCANNING APPARATUS AND IMAGE FORMING APPARATUS

(71) Applicant: CANON KABUSHIKI KAISHA, Tokyo (JP)

(72) Inventors: Ryota Sato, Tochigi (JP); Seiji Kuwabara, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/879,925

(22) Filed: Aug. 3, 2022

(65) Prior Publication Data

US 2023/0077901 A1 Mar. 16, 2023

(30) Foreign Application Priority Data

Aug. 31, 2021 (JP) ................... 2021-140602

(51) Int. Cl.
*G03G 15/04* (2006.01)
*G03G 15/041* (2006.01)
*G02B 5/08* (2006.01)
*G02B 26/08* (2006.01)
*G02B 5/09* (2006.01)

(52) U.S. Cl.
CPC ....... *G03G 15/0409* (2013.01); *G02B 5/0841* (2013.01); *G02B 5/09* (2013.01); *G02B 26/0816* (2013.01); *G03G 15/0415* (2013.01); *G03G 2215/00177* (2013.01)

(58) Field of Classification Search
CPC .. G03G 15/04; G03G 15/0409; G02B 5/0841; G02B 5/09; G02B 26/0816

USPC ......................................................... 399/177
See application file for complete search history.

(56) References Cited

U.S. PATENT DOCUMENTS

| | | | | |
|---|---|---|---|---|
| 8,896,893 | B2* | 11/2014 | Kudo | G02B 26/123 |
| | | | | 358/475 |
| 10,372,060 | B2* | 8/2019 | Iida | G03G 15/043 |
| 2018/0157189 | A1* | 6/2018 | Imine | G03G 15/0415 |
| 2022/0234363 | A1 | 7/2022 | Kudo et al. | |

FOREIGN PATENT DOCUMENTS

JP 2007292918 A 11/2007

* cited by examiner

*Primary Examiner* — Hoan H Tran
(74) *Attorney, Agent, or Firm* — Carter, DeLuca & Farrell LLP

(57) ABSTRACT

A light scanning apparatus according to the present invention includes a deflecting unit configured to deflect a light flux to scan a scanned surface in a main scanning direction, and an imaging optical system configured to guide the light flux deflected by the deflecting unit to the scanned surface and to have different partial magnifications in the main scanning direction between an on-axis image height and an outermost off-axis image height. A ratio of a reflectivity at a first outermost off-axis deflection point on one side with respect to an on-axis deflection point on a deflecting surface of the deflecting unit to that at the on-axis deflection point, and a ratio of the reflectivity at a second outermost off-axis deflection point on the other side with respect to the on-axis deflection point on the deflecting surface to that at the on-axis deflection point are each appropriately set.

16 Claims, 15 Drawing Sheets

LIGHT SCANNING APPARATUS AND IMAGE FORMING APPARATUS

BACKGROUND OF THE INVENTION

Field of the Invention

The present invention is related to a light scanning apparatus and an image forming apparatus.

Description of the Related Art

Conventionally, there is known a light scanning apparatus which is configured to have a nonuniform scanning speed characteristic in which a scanning speed by a light flux is different between an on-axis image height and an off-axis image height to achieve downsizing.

In such light scanning apparatus, it is known that a light amount unevenness occurs since an exposure amount per unit area is different at each image height on a scanned surface due to the difference in the scanning speed between the on-axis image height and the off-axis image height.

Japanese Patent Application Laid-Open No. 2007-292918 discloses a light scanning apparatus in which a light emission time of a light source w % ben emitting a light flux for scanning the on-axis image height is made different from that when emitting a light flux for scanning the off-axis image height to reduce the light amount unevenness on the scanned surface.

However, in the light scanning apparatus disclosed in Japanese Patent Application Laid-Open No. 2007-292918, it is necessary to newly provide a controller for controlling the light emission time of the light source, so that a structure thereof becomes complicated and a size thereof becomes increased.

SUMMARY OF THE INVENTION

An object of the present invention is to provide a light scanning apparatus capable of reducing the light amount unevenness on the scanned surface with a small and simple structure and an image forming apparatus including the light scanning apparatus.

A light scanning apparatus according to the present invention includes a deflecting unit configured to deflect a light flux to scan a scanned surface in a main scanning direction, and an imaging optical system configured to guide the light flux deflected by the deflecting unit to the scanned surface and to have different partial magnifications in the main scanning direction between an on-axis image height and an outermost off-axis image height, in which, when a ratio of reflectivity at a first outermost off-axis deflection point on one side with respect to an on-axis deflection point on a deflecting surface of the deflecting unit to the reflectivity at the on-axis deflection point is represented by $\Delta R_1$, and a ratio of the reflectivity at a second outermost off-axis deflection point on the other side with respect to the on-axis deflection point on the deflecting surface to the reflectivity at the on-axis deflection point is represented by $\Delta R_2$, the following conditions are satisfied:

$1.05 \le |\Delta R_1| \le 1.50$; and $1.05 \le |\Delta R_2| \le 1.50$.

Further features of the present invention will become apparent from the following description of exemplary embodiments with reference to the attached drawings.

DESCRIPTION OF THE EMBODIMENTS

Hereinafter, the light scanning apparatus according to the present invention will be described in detail with reference to accompanying drawings. In order to facilitate understanding of the present invention, the drawings shown below may be drawn in a scale different from an actual scale.

In the following description, a main scanning direction is a direction perpendicular to a rotation axis of a deflecting unit and an optical axis of an optical system (a direction in which a light flux is deflected for scanning by the deflecting unit). The sub-scanning direction is a direction parallel to the rotation axis of the deflecting unit. The main scanning cross section is a cross section perpendicular to the sub-scanning direction. The sub-scanning section is a section perpendicular to the main scanning direction.

First Embodiment

Conventionally, there is known a light scanning apparatus which is designed to have a characteristic of scanning a scanned surface at a nonuniform speed to achieve downsizing.

In such light scanning apparatus, it is known that a light amount unevenness occurs on a scanned surface since an exposure amount per unit area is different according to a difference in the scanning speed at each image height.

Further, various methods are proposed for reducing the light amount unevenness generated in such light scanning apparatus. For example, there is proposed a method of reducing the light amount unevenness on the scanned surface by changing a light emission time of a light source at each image height.

However, in order to change the light emission time of the light source in the above-described method, it is necessary to newly provide a controller for electrically controlling the light source.

In addition, a method of reducing the light amount unevenness in a formed image by arranging a photosensitive drum having a different light sensitivity at respective image heights at a position of the scanned surface is proposed in an image forming apparatus including such light scanning apparatus.

However, it is necessary to provide a special drum member having the different light sensitivity at each image height in the above-described method.

That is, it is necessary to provide new components and software, so that a structure becomes complicated, and a size and a cost become increased in any of the above-mentioned methods.

Accordingly, an object of the present invention is to provide a light scanning apparatus capable of realizing a uniform light amount distribution on a scanned surface without requiring a complicated structure with a characteristic of scanning the scanned surface at a nonuniform speed.

Figure 1A:
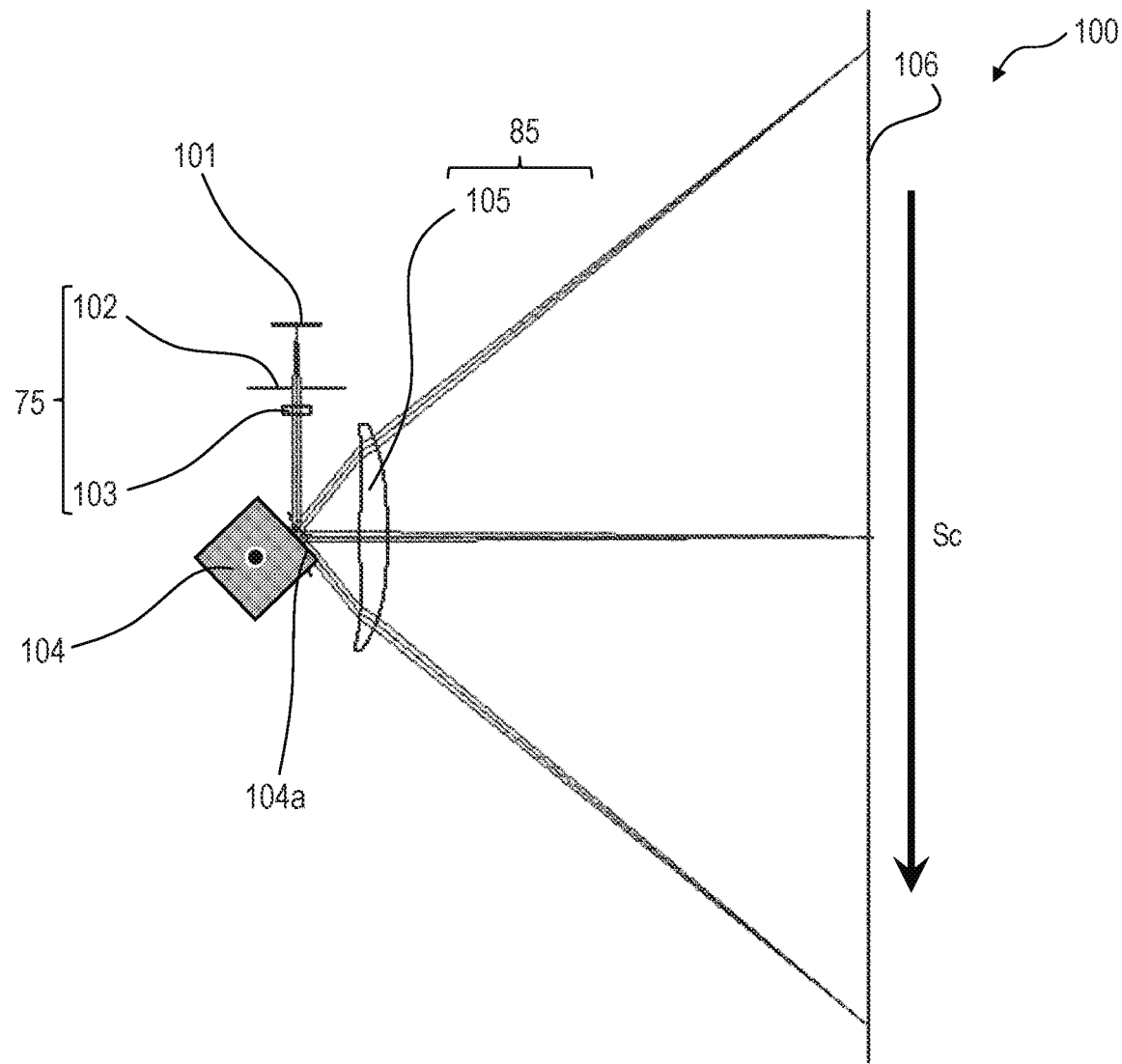
FIG. 1A is a schematic main scanning cross sectional view of a light scanning apparatus according to a first embodiment of the present invention.
Figure 1B:
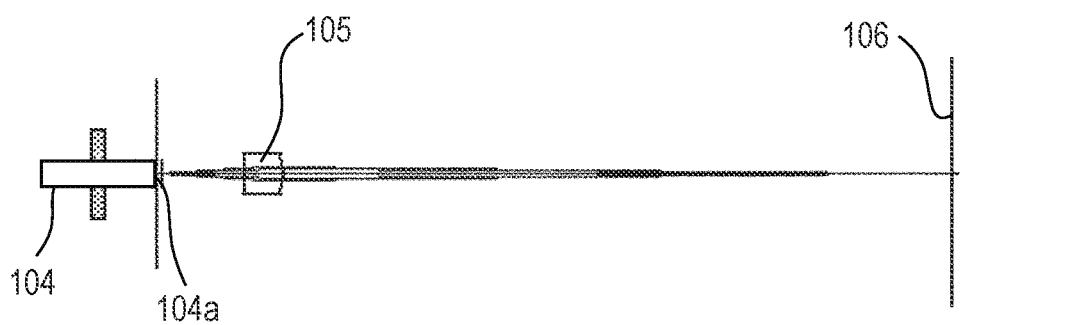
FIG. 1B is a partially enlarged schematic sub-scanning cross sectional view of the light scanning apparatus according to the first embodiment.

FIGS. 1A and 1B show a schematic main-scanning cross sectional view and a partially enlarged schematic sub-scanning cross sectional view of the light scanning apparatus 100 according to a first embodiment of the present invention, respectively.

The light scanning apparatus 100 according to the present embodiment includes a light source 101, a stop 102, an incident optical element 103, a deflecting unit 104 and an imaging optical element 105.

In the light scanning apparatus 100 according to the present embodiment, the stop 102 and the incident optical element 103 form an incident optical system 75, and the imaging optical element 105 forms an imaging optical system 85.

As the light source 101, for example, a semiconductor laser can be used, and the number of light emitting points may be one or more.

The stop 102 has an elliptical opening, and restricts a diameter of the light flux emitted from the light source 101 in each of the main scanning direction and the sub-scanning direction.

The incident optical element 103 has a positive refractive power in the main scanning section, and converts the light flux passing through the stop 102 into a parallel light flux in the main scanning section. Here, the parallel light flux includes not only a strictly parallel light flux but also a substantially parallel light flux, such as a weakly divergent light flux or a weakly convergent light flux. In the light scanning apparatus 100 according to the present embodiment, the light flux passing through the stop 102 is converted into the weakly convergent light flux to reduce a refractive power required for the imaging optical element 105.

Further, the incident optical element 103 has a positive refractive power in the sub-scanning section, and forms a line image long in the main scanning direction by condensing the light flux passing through the stop 102 in the vicinity of a deflecting surface 104a of the deflecting unit 104 in the sub-scanning section.

In the light scanning apparatus 100 according to the present embodiment, a width in the main scanning section of the light flux when entering the deflecting unit 104 is smaller than the width in the main scanning section of the deflecting surface 104a of the deflecting unit 104.

The imaging optical element 105 has a positive refractive power in each of the main scanning section and the sub-scanning section, and forms a spot-like image in the vicinity of the scanned surface 106 by condensing the light flux deflected by the deflecting unit 104 in each of the main scanning section and the sub-scanning section.

Specifically, the imaging optical element 105 has two optical surfaces (lens surfaces) of an incident surface and an exit surface, and is configured such that the light flux deflected by the deflecting surface 104a of the deflecting unit 104 scans the scanned surface 106 with a desired scanning characteristic in the main scanning section.

Further, the imaging optical element 105 is configured such that the vicinity of the deflecting surface 104a of the deflecting unit 104 and the vicinity of the scanned surface 106 have a conjugate relationship with each other in the sub-scanning section to compensate a facet angle error (namely, to reduce a scanning position shift in the sub-scanning direction on the scanned surface 106 when the deflecting surface 104a tilts).

In this way, the light flux emitted from the light source 101 passes through the stop 102 and the incident optical element 103, and then is incident on the deflecting surface 104a of the deflecting unit 104.

The light flux reflected to be deflected by the deflecting surface 104a of the deflecting unit 104 is guided to the scanned surface 106 by the imaging optical element 105.

In the light scanning apparatus 100 according to the present embodiment, an electrostatic latent image is formed on the scanned surface 106 by optically scanning the scanned surface 106 in a main scanning direction indicated by an arrow Sc by rotating the deflecting unit 104 at a constant speed by a driving unit (not shown).

In the light scanning apparatus 100 according to the present embodiment, when the deflecting unit 104 reaches a predetermined scanning angle, the deflected light flux is guided to a synchronous detection sensor (not shown) by a synchronous detection optical system (not shown).

A rotation speed of the deflecting unit 104 is controlled to be constant based on a synchronous detection signal acquired by the synchronous detection sensor.

In the light scanning apparatus 100 according to the present embodiment, a plurality of optical elements, such as a coupling lens and a cylindrical lens may be provided instead of the incident optical element 103.

Further, in the light scanning apparatus 100 according to the present embodiment, a plastic molded lens formed by injection molding is used as each of the incident optical element 103 and the imaging optical element 105, but the present invention is not limited thereto, and a glass molded lens may be used.

Since the molded lens is easy to form an aspherical shape and is suitable for mass production, it is possible to improve a productivity and an optical performance of each of the incident optical element 103 and the imaging optical element 105 by using the molded lens.

Next, various values of the light scanning apparatus 100 according to the present embodiment are shown in the following Tables 1, 2 and 3.

TABLE 1

| | Parameter [unit] | Value |
|---|---|---|
| Angle between an optical axis of the incident optical system 75 and that of the imaging optical system 85 | $\Psi$ [rad] | 1.571 |
| Width of the scanned surface 106 | W [mm] | ±107 |
| Imaging coefficient at the on-axis image height | KK [mm] | 109.662 |
| Scanning characteristic coefficient | α | 13.281 |
| Maximum scanning angle of view | $q_{max}$ [rad] | 0.890 |
| Number of deflecting surfaces in the deflecting unit 104 | | 4 |
| Position of rotation center of the deflecting unit 104 (in the optical axis direction of the imaging optical system 85) | Px [mm] | −5.89 |
| Position of rotation center of the deflecting unit 104 (in the main scanning direction) | Py [mm] | −4.11 |
| Diameter of circumscribed circle of the deflecting unit 104 (in the main scanning section) | [mm] | 10 |
| Diameters of the stop 102 (main scanning direction × sub-scanning direction) | Am × As [mm] | 1.644 × 1.606 |
| Length of optical path in the imaging optical system 85 | Tc [mm] | 125 |

TABLE 2

| Surface number | Surface | Surface interval | Refractive index (at λ = 780 nm) | Coordinates of vertex of optical surface | | | Direction cosine of optical axis of optical surface | | |
|---|---|---|---|---|---|---|---|---|---|
| | | | | tc(x) | tc(y) | tc(z) | gx(x) | gx(y) | gx(z) |
| 1 | Light source 101 | 0.250 | 1.516 | 0.000 | 46.500 | 0.000 | 0.000 | 1.000 | 0.000 |
| 2 | Cover glass of laser chip | 13.860 | 1.000 | 0.000 | 46.250 | 0.000 | 0.000 | 1.000 | 0.000 |
| 3 | Stop 102 | 3.720 | 1.000 | 0.000 | 32.390 | 0.000 | 0.000 | 1.000 | 0.000 |
| 4 | Incident surface of the incident optical element 103 | 2.000 | 1.535 | 0.000 | 28.670 | 0.000 | 0.000 | 1.000 | 0.000 |
| 5 | Exit surface of the incident optical element 103 | 26.670 | 1.000 | 0.000 | 26.670 | 0.000 | 0.000 | 1.000 | 0.000 |
| 6 | Deflecting surface 104a of the deflecting unit 104 (when deflecting the on-axis light flux) | 13.800 | 1.000 | 0.000 | 0.000 | 0.000 | 0.707 | 0.707 | 0.000 |
| 7 | Incident surface of the imaging optical element 105 | 6.000 | 1.535 | 13.800 | 0.000 | 0.000 | 1.000 | 0.000 | 0.000 |

TABLE 2-continued

| Surface number | Surface | Surface interval | Refractive index (at λ = 780 nm) | Coordinates of vertex of optical surface | | | Direction cosine of optical axis of optical surface | | |
|---|---|---|---|---|---|---|---|---|---|
| | | | | tc(x) | tc(y) | tc(z) | gx(x) | gx(y) | gx(z) |
| 8 | Exit surface of the imaging optical element 105 | 105.200 | 1.000 | 19.800 | 0.000 | 0.000 | 1.000 | 0.000 | 0.000 |
| 9 | Scanned surface 106 | — | 1.000 | 125.000 | 0.000 | 0.000 | 1.000 | 0.000 | 0.000 |

TABLE 3

Aspheric coefficients

| | | Incident optical element 103 | | Imaging optical element 105 | |
|---|---|---|---|---|---|
| | Coefficients | Incident surface | Exit surface | Incident surface | Exit surface |
| Meridional line | R | ∞ | 4.1500E+01 | 9.7906E+01 | −1.7868E+02 |
| | K | — | — | −1.4489E+01 | 3.9061E+01 |
| | B3 | — | — | 2.5817E−05 | 2.1369E−05 |
| | B4 | — | — | −2.3315E−05 | −1.0327E−05 |
| | B5 | — | — | 1.8963E−08 | −3.0331E−09 |
| | B6 | — | — | 4.5592E−08 | −7.5248E−11 |
| | B7 | — | — | 1.2019E−12 | 8.7410E−11 |
| | B8 | — | — | −4.5947E−11 | 2.0089E−11 |
| | B9 | — | — | −1.5088E−14 | −4.6523E−14 |
| | B10 | — | — | 1.6225E−14 | −1.8431E−14 |
| Sagittal line | r | ∞ | 1.2400E+01 | −2.5044E+01 | −6.9630E+00 |
| | E1 | — | — | −1.4028E−03 | −8.4572E−04 |
| | E2 | — | — | −5.0734E−06 | 1.5994E−04 |
| | E3 | — | — | 9.3596E−07 | −3.4572E−07 |
| | E4 | — | — | 1.4736E−07 | −6.1692E−07 |
| | E5 | — | — | 1.5495E−09 | 1.2716E−10 |
| | E6 | — | — | −3.5958E−10 | 1.2290E−09 |
| | E7 | — | — | −2.3060E−12 | 2.8528E−12 |
| | E8 | — | — | 2.2893E−13 | −1.1134E−12 |
| | E9 | — | — | 2.2434E−15 | −2.5529E−15 |
| | E10 | — | — | −4.3355E−16 | −8.1958E−17 |
| Additional shape | C3 | −2.6034E−02 | — | — | — |
| | C5 | −2.2170E−02 | — | — | — |

As shown in Table 3, an incident surface of the incident optical element 103 provided in the light scanning apparatus 100 according to the present embodiment is designed as a diffracting surface on which a diffraction grating is formed.

Thereby, the incident optical element 103 formed by injection molding using a plastic material can be used as a so-called temperature compensation optical system in which a change in refractive power due to an environmental variation is compensated by a change in diffraction power due to a change in wavelength of a light flux emitted from the semiconductor laser.

When an intersection point between the optical axis of the incident optical element 103 and the incident surface of the incident optical element 103 is defined as an origin, and axes orthogonal to the optical axis in the main scanning section and the sub-scanning section are defined as a Y-axis and a Z-axis, respectively, the diffraction surface formed on the incident surface of the incident optical element 103 provided in the light scanning apparatus 100 according to the present embodiment is defined by a phase function as represented by the following expression (1):

$$\phi = \frac{2\pi M}{\lambda}(C_3 Z^2 + C_5 Y^2), \quad (1)$$

where $\phi$ is the phase function, M is a diffraction order, and $\lambda$ is a design wavelength. In the light scanning apparatus 100 according to the present embodiment, a first order diffracted light (namely, the diffracted order M is 1) is used, and the design wave length $\lambda$ is 790 nm.

Further, meridional line shapes of the incident surface and the exit surface of the imaging optical element 105 provided in the light scanning apparatus 100 according to the present embodiment are formed by aspheric shapes which can be expressed by functions up to the tenth order of Y, respectively.

Specifically, in each of the incident surface and the exit surface of the imaging optical element 105, when an intersection point with the optical axis of the imaging optical element 105 is defined as an origin, an optical axis direction is defined as an X axis, and an axis orthogonal to the optical axis in the main scanning cross section is defined as a Y axis, the meridional line shape is defined by the following expression (2):

$$X = \frac{\frac{Y^2}{R}}{1 + \sqrt{1 - (1+K)\left(\frac{Y}{R}\right)^2}} + B_3 Y^3 + B_4 Y^4 + B_5 Y^5 + B_6 Y^6 + B_7 Y^7 + B_8 Y^8 + B_9 Y^9 + B_{10} Y^{10}, \quad (2)$$

where R is a meridional line curvature radius, and K, $B_3$, $B_4$, $B_5$, $B_6$, $B_7$, $B_8$, $B_9$ and $B_{10}$ are aspheric coefficients.

Further, in each of the incident surface and the exit surface of the imaging optical element 105, when the intersection point with the optical axis of the imaging optical element 105 is defined as the origin and an axis orthogonal to the optical axis in the sub-scanning section is defined as a Z-axis, sagittal line shapes of the incident surface and the exit surface of the imaging optical element 105 provided in the light scanning apparatus 100 according to the present embodiment are defined by the following expression (3):

$$S = \frac{\frac{Z^2}{r'}}{1 + \sqrt{1 - \left(\frac{Z}{r'}\right)^2}}, \quad (3)$$

where S is a sagittal line shape defined in a plane including a normal line of the meridional line at each position in the meridional line direction and perpendicular to the main scanning section.

In addition, a curvature radius in the sub-scanning section at a position separated from the optical axis of the imaging optical element 105 by Y in the main scanning direction on each of the incident surface and the exit surface of the imaging optical element 105, namely a sagittal line curvature radius r' is defined by the following expression (4):

$$\frac{1}{r'} = \frac{1}{r} + E_1 Y^1 + E_2 Y^2 + E_3 Y^3 + \\ E_4 Y^4 + E_5 Y^5 + E_6 Y^6 + E_7 Y^7 + E_8 Y^8 + E_9 Y^9 + E_{10} Y^{10}, \quad (4)$$

where r is the sagittal line curvature radius on the optical axis, and $E_1, E_2, E_3, E_4, E_5, E_6, E_7, E_8, E_9$ and $E_{10}$ are sagittal line variation coefficients.

Note that the shape of the optical surface is defined by the above-described expressions (1) to (4) in the light scanning apparatus 100 according to the present embodiment, but the scope of the right of the present invention is not limited thereto.

As described above, the expression (2) represents the shape (meridional shape) of the optical surface in the main-scanning section (XY section), and the expression (3) represents the shape (sagittal shape) of the optical surface in the sub-scanning section (XZ section) at an arbitrary image height Y.

At this time, as shown in the expression (4), the sagittal line curvature radius r' of the optical surface varies according to the value of Y.

Next, scanning characteristics of the light scanning apparatus 100 according to the present embodiment will be described.

The imaging optical element 105 provided in the light scanning apparatus 100 according to the present embodiment has the scanning characteristic such that the scanning light flux passing therethrough does not have a uniform speed property on the scanned surface 106.

Since the imaging optical element 105 has such scanning characteristic, it is possible to arrange the imaging optical element 105 close to the deflecting unit 104, thereby, it is possible to achieve a reduction in diameter of the imaging optical element 105 and a reduction in size of the light scanning apparatus 100.

Specifically, the scanning characteristic of the imaging optical element 105 provided in the light scanning apparatus 100 according to the present embodiment is expressed by the following expression (5):

$$Y = KK \cdot \theta + \alpha \cdot \theta^3 \quad (5),$$

where a scanning angle by the deflecting unit 104 is represented by θ [rad], a condensed position (image height) in the main scanning direction on the scanned surface 106 of the light flux deflected in the direction of the scanning angle θ is represented by Y [mm], and an imaging coefficient at the on-axis image height is represented by KK [mm/rad].

In the light scanning apparatus 100 according to the present embodiment, the on-axis image height refers to an image height (Y=0) on the optical axis, and corresponds to the scanning angle θ=0.

Further, the off-axis image height refers to an image height outside the optical axis (Y is other than 0), namely corresponds to a scanning angle θ other than 0, and the outermost off-axis image height refers to an image height when the scanning angle θ is maximum (at maximum scanning angle of view).

Further, the imaging coefficient KK in the expression (5) is a coefficient corresponding to f in the scanning characteristic (fθ characteristic) Y=fθ in a case where a completely parallel light flux is incident on the imaging optical element 105.

That is, the imaging coefficient KK is a coefficient for establishing a proportional relation between the image height Y and the scanning angle θ similarly to the fθ characteristic in a case where a light flux other than a completely parallel light flux is incident on the imaging optical element 105.

In the light scanning apparatus 100 according to the present embodiment, the light flux incident on the imaging optical element 105 is set to be a weakly convergent light flux in the main scanning direction, and the imaging coefficient KK at the on-axis image height is set so as to match it.

Further, α in the expression (5) is a coefficient (hereinafter referred to as a scanning characteristic coefficient) for determining the scanning characteristic of the imaging optical element 105 provided in the light scanning apparatus 100 according to the present embodiment, and is set to a positive value as shown in Table 1.

For example, in the case of α=0, since the expression (5) becomes Y=KK·θ, it corresponds to Y=fθ which is the scanning characteristic of the imaging optical element used in the conventional light scanning apparatus.

When both sides of the expression (5) are differentiated with respect to the scanning angle θ, a scanning speed of the light flux on the scanned surface 106 at the scanning angle θ is obtained as shown in the following expression (6):

$$\frac{dY}{d\theta} = KK + 3\alpha \cdot \theta^2. \quad (6)$$

Further, when both sides of the expression (6) are divided by the scanning speed dY/dθ(θ=0) at the on-axis image height, namely the imaging coefficient KK, the following expression (7) is obtained:

$$\frac{1}{KK} \cdot \frac{dY}{d\theta} = 1 + \frac{3\alpha}{KK} \theta^2. \quad (7)$$

Here, (dY/dθ)/KK shown in the expression (7) corresponds to a deviation amount from the uniform speed property at each off-axis image height with respect to the on-axis image height, namely a ratio (a deviation of the partial magnification) of a partial magnification at the off-axis image height with respect to that at the on-axis image height.

That is, in a case where α=0 is not satisfied as the light scanning apparatus 100 according to the present embodiment, the scanning speed by the light flux differs between the on-axis image height and the off-axis image height as shown in the expression (6).

In other words, in the light scanning apparatus 100 according to the present embodiment, the imaging optical system 85 is configured such that the partial magnification in the main scanning direction differs between the on-axis image height and the off-axis image height.

Figure 2:
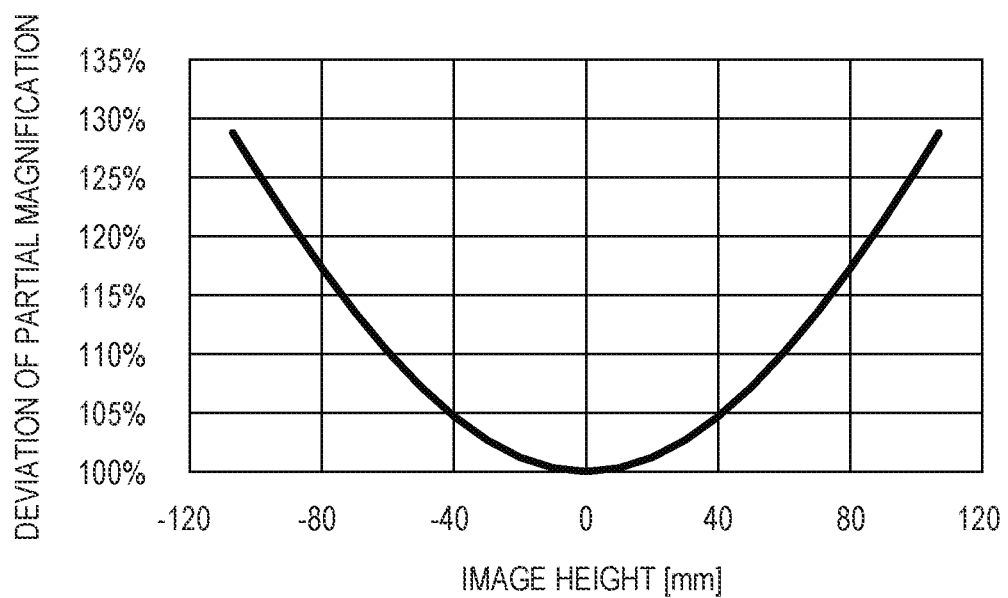
FIG. 2 is a graph showing an image height dependence of a deviation of partial magnification in the light scanning apparatus according to the first embodiment.

FIG. 2 shows an image height dependence of the deviation of the partial magnification in the light scanning apparatus 100 according to the present embodiment.

As shown in FIG. 2, in the light scanning apparatus 100 according to the present embodiment, the partial magnification increases from the on-axis image height toward one outermost off-axis image height in the main scanning direction, and increases from the on-axis image height toward the other outermost off-axis image height.

That is, the scanning speed at the off-axis image height is set to be larger than that at the on-axis image height in the light scanning apparatus 100 according to the present embodiment.

Thereby, the scanning position (a scanning distance per unit time) at the off-axis image height is elongated according to the deviation of the partial magnification.

Accordingly, in a case where the scanned surface 106 is optically scanned with rotating the deflecting unit 104 at a constant angular velocity, unevenness occurs in the light amount distribution in the main scanning direction on the scanned surface 106.

Further, as can be seen from the expression (7), the deviation of the partial magnification in the light scanning apparatus 100 according to the present embodiment exhibits a quadratic function profile with respect to the image height.

Next, a structure of the deflecting unit 104 provided in the light scanning apparatus 100 according to the present embodiment will be described.

As described above, the deflecting unit 104 is rotated at a constant speed to deflect the light flux passing through the incident optical element 103 with changing the scanning angle θ, thereby the scanned surface 106 is optically scanned in the light scanning apparatus 100 according to the present embodiment.

At this time, an incident angle of the light flux on the deflecting surface 104a varies depending on the scanning angle θ at which the light flux is deflected. Accordingly, it is possible to reduce the light amount unevenness on the scanned surface 106 due to the above-described nonuniform speed scanning by imparting an appropriate incident angle dependence to a reflectivity of the deflecting surface 104a.

Here, the incident angle of the light flux on the deflecting surface 104a is defined as an angle (acute angle) formed between the incident direction of a principal ray of the light flux on the deflecting surface 104a and a normal direction of the deflecting surface 104a.

Specifically, in the light scanning apparatus 100 according to the present embodiment, an incident angle on a deflection point (hereinafter referred to as an on-axis deflection point) in the deflecting surface 104a of a principal ray of a light flux (hereinafter referred to as an on-axis light flux) deflected by the deflecting unit 104 so as to scan the on-axis image height on the scanned surface 106 is about 45.0°.

Further, the incident angle on a deflection point (hereinafter referred to as an outermost off-axis deflection point) in the deflecting surface 104a of a marginal ray of a light flux (hereinafter referred to as an outermost off-axis light flux) deflected by the deflecting unit 104 so as to scan one outermost off-axis image height (writing start side) on the scanned surface 106 farthest from the on-axis deflection point on one side in the main scanning direction is about 19.5°.

Furthermore, the incident angle on an outermost off-axis deflection point in the deflecting surface 104a of the marginal ray of an outermost off-axis light flux deflected by the deflecting unit 104 so as to scan the other outermost off-axis image height (writing end side) on the scanned surface 106 farthest from the on-axis deflection point on the other side in the main scanning direction is about 70.5°.

In the light scanning apparatus 100 according to the present embodiment, a polygon mirror with four deflecting surfaces in each of which a reflection film having an appropriate angle characteristic of reflectivity is provided on a substrate formed by resin molding is used as the deflecting unit 104.

However, the present invention is not limited thereto, and the effect of the present embodiment can also be obtained by providing the reflection film having the appropriate angle characteristic of reflectivity on a substrate formed by metal or glass.

Further, the effect of the present embodiment can be obtained not only by the polygon mirror but also by providing the reflection film having the appropriate angle characteristic of reflectivity on a reflecting element, such as a galvanometer mirror.

Furthermore, the number of deflecting surfaces is not limited to four, and the effect of the present embodiment can be obtained even in the polygon mirror having five or more deflecting surfaces, for example.

Next, a structure of the reflection film formed on the deflecting surface 104a of the deflecting unit 104 provided in the light scanning apparatus 100 according to the present embodiment will be described.

As described above, the light amount unevenness on the scanned surface 106 due to the nonuniform speed scanning can be reduced by providing the deflecting surface 104a with such the characteristic that the reflectivity varies according to the incident angle of the light flux on the deflecting surface 104a.

In the light scanning apparatus 100 according to the present embodiment, specifically, the reflection film with such the angle characteristic of reflectivity that the reflectivity increases with respect to an incident angle of a light flux (hereinafter referred to as an off-axis light flux) deflected so as to scan off-axis image height at which the scanning speed increases (hereinafter referred to as an off-axis light flux) may be provided on the deflecting surface 104a.

That is, the reflection film with such the angle characteristic of reflectivity that the reflectivity increases at the incident angle smaller or larger than that of the on-axis light flux may be provided on the deflecting surface 104a.

Figure 3A:
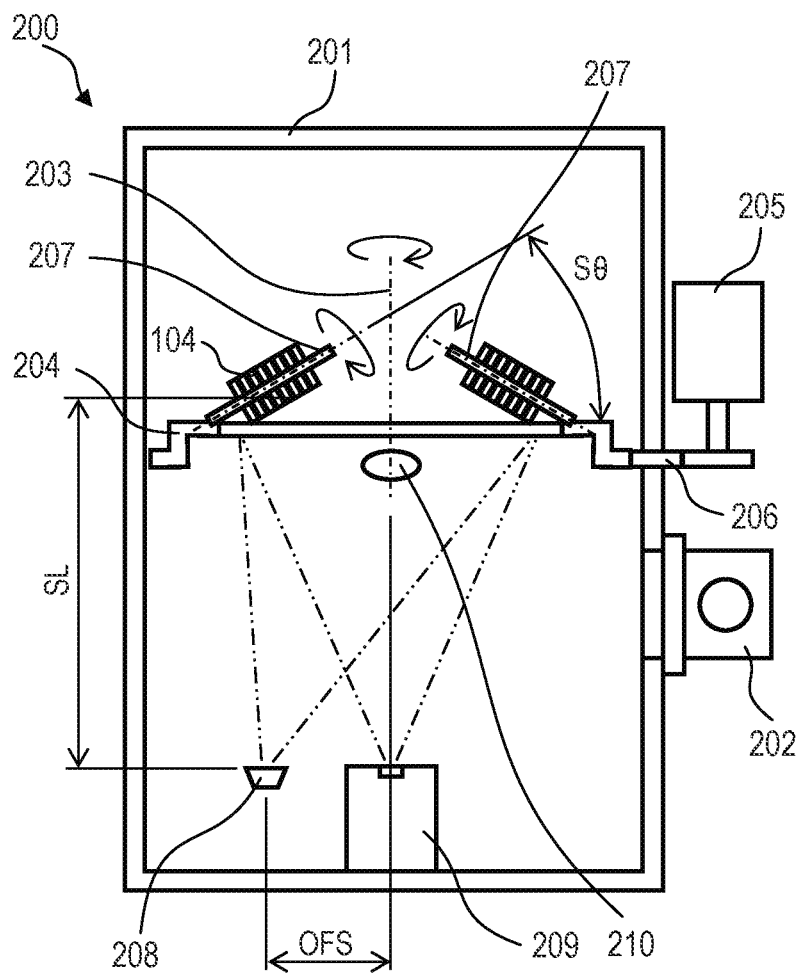
FIG. 3A is a schematic cross sectional view of a vacuum vapor deposition apparatus for forming a film on a deflecting surface in a deflecting unit.
Figure 3B:
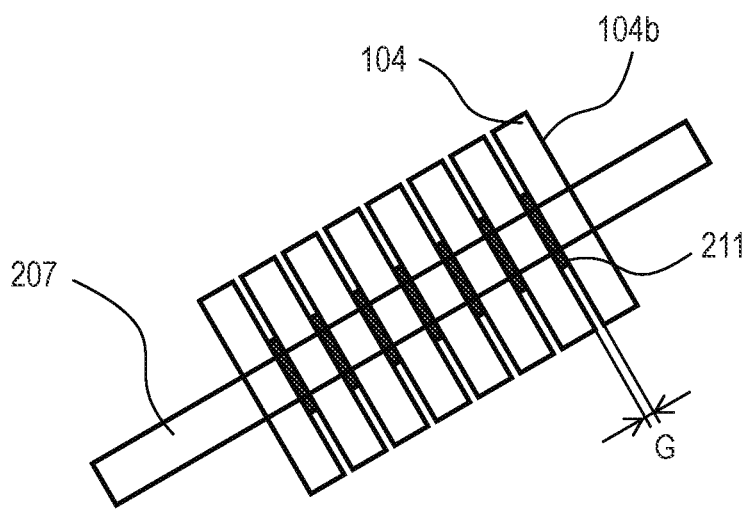
FIG. 3B is a partially enlarged schematic cross sectional view of the vacuum vapor deposition apparatus for forming the film on the deflecting surface in the deflecting unit.

FIGS. 3A and 3B show a schematic cross sectional view and a partially enlarged schematic cross sectional view of a vacuum vapor deposition apparatus 200 for forming a film on the deflecting surface 104a of the deflecting unit 104 provided in the light scanning apparatus 100 according to the present embodiment, respectively.

The vacuum vapor deposition apparatus 200 is provided with a film forming chamber 201 capable of maintaining an inside in a vacuum state, and an exhausting system 202 formed by a vacuum pump or the like for exhausting the film forming chamber 201.

In the film forming chamber 201, a revolution component 204 capable of revolution driving around a revolution axis 203 is arranged, and the revolution driving of the revolution component 204 is performed by a driving mechanism 205 via a gear 206.

A plurality of deflecting units 104 are arranged with laminated such that a rotation component 207 provided in the film forming chamber 201 penetrates a hole formed at a center of each of them.

Then, the rotation component 207 in which the plurality of deflecting units 104 are arranged as described above is disposed with inclined so as to form an angle Sθ with respect to the revolution component 204, and the rotation driving of the rotation component 207 is performed by a driving mechanism (not shown).

As described above, by revolution driving the revolution component 204 and rotation driving the rotation component 207, the film is formed on the deflecting surface 104a in the state where the deflecting unit 104 performs the rotation and the revolution.

The vacuum vapor deposition apparatus 200 is provided with a liner 208, an ion gun 209 and a quartz film thickness sensor 210.

Further, an argon introduction line (not shown) and an oxygen introduction line (not shown) for introducing oxygen gas are provided in the film forming chamber 201.

The liner 208 is arranged at a position separated from the revolution axis 203 by a distance OFS and the deflecting unit 104 by a height SL.

As shown in FIG. 3B, the plurality of deflecting units 104 are arranged along the axial direction of the rotation component 207 such that a surface 104b perpendicular to the plurality of deflecting surfaces 104a faces upward and they are spaced apart from each other by a gap G through a spacer 211.

A film forming method for forming the reflection film on the deflecting surface 104a of the deflecting unit 104 is not limited at all, and a reflection film with a predetermined characteristic can be formed by using a known film forming technology, such as a vacuum vapor deposition method or a sputtering method.

Next, a structure of the reflection film provided on the deflecting surface 104a of the deflecting unit 104 provided in the light scanning apparatus 100 according to the present embodiment is shown in the following Table 4.

TABLE 4

|   | Film material | Physical film thickness [nm] |
|---|---|---|
| 5 | $SiO_2$ | 94.48 |
| 4 | $Ta_2O_5$ | 263.52 |
| 3 | $SiO_2$ | 331.03 |
| 2 | Al | 100 |
| 1 | $SiO_2$ | 150 |
| 0 | Base material | — |

As shown in Table 4, the reflection film formed by a multilayer film consisting of five layers is provided on the deflecting surface 104a of the deflecting unit 104 provided in the light scanning apparatus 100 according to the present embodiment.

Specifically, a first layer made of a low refractive index dielectric material $SiO_2$ (silicon dioxide) is formed as a ground layer (adhesion layer) for improving an adhesion without affecting an optical performance between a zeroth layer as a base material formed by a predetermined resin and a second layer corresponding to a metal layer.

A multilayer film is formed on the first layer such that a second layer made of a metal material Al (aluminum) as a main component as a metal layer, a third layer (first low refractive index dielectric layer) made of the low refractive index dielectric material $SiO_2$, a fourth layer (high refractive index dielectric layer) made of a high refractive index dielectric material $Ta_2O_5$ (tantalum pentoxide), and a fifth layer (second low refractive index dielectric layer) made of the low refractive index dielectric material $SiO_2$ as an outermost layer are laminated in this order. The term "main component" as used herein indicates that 95% or more of the component is contained.

In other words, in the light scanning apparatus 100 according to the present embodiment, the multilayer film forming the reflection film provided on the deflecting surface 104a of the deflecting unit 104 includes, in order from the substrate side, the ground layer, the metal layer, the first low refractive index dielectric layer, the high refractive index dielectric layer and the second low refractive index dielectric layer.

The low refractive index dielectric material $SiO_2$ has the refractive index of 1.45 at $\lambda=790$ nm, and the high refractive index dielectric material $Ta_2O_5$ has the refractive index of 1.99 at k=790 nm.

Further, the film configuration and the film structure of the reflection film provided on the deflecting surface 104a of the deflecting unit 104 provided in the light scanning apparatus 100 according to the present embodiment are not limited to those described above.

The physical film thickness of each layer shown in Table 4 indicates a thickness of the film formed on each layer.

When the multilayer film is formed on the deflecting surface 104a, a pressure in the film forming chamber 201 is reduced to $1.3\times10^{-2}$ Pa by the exhaustion of the exhausting system 202, and then the above-described materials are deposited on the deflecting surface 104a by the liner 208.

The film forming speed is controlled by the quartz film thickness sensor 210, and specifically is set to 2.5 nm/sec, 1.6 nm/sec and 0.4 nm/sec for the metal material Al, the low refractive index dielectric material $SiO_2$ and the high refractive index dielectric material $Ta_2O_5$, respectively.

When the film is formed with respect to the low refractive index dielectric material $SiO_2$ and the high refractive index dielectric material $Ta_2O_5$, ion assisting is performed by the ion gun 209.

Figure 4:
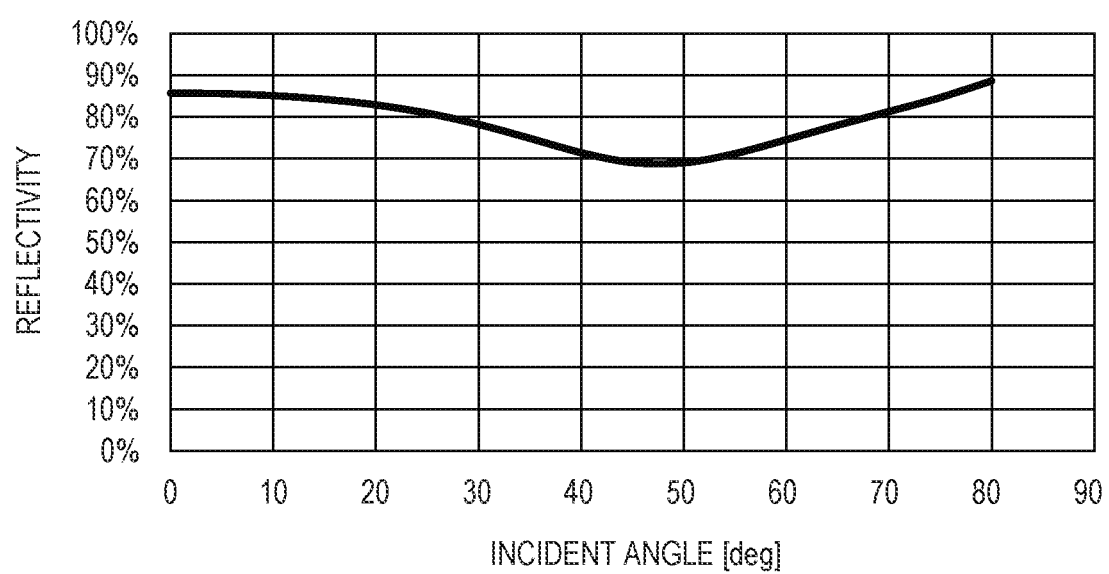
FIG. 4 is a graph showing an incident angle dependence of reflectivity of the deflecting surface in the deflecting unit included in the light scanning apparatus according to the first embodiment.

FIG. 4 shows an incident angle dependence of the reflectivity of the deflecting surface 104a of the deflecting unit 104 provided in the light scanning apparatus 100 according to the present embodiment. In FIG. 4, only the reflectivity of the P-polarized component is shown.

As shown in FIG. 4, in the light scanning apparatus 100 according to the present embodiment, a characteristic is set such that the reflectivity is relatively large in the vicinity of 19.5° and 70.5° which are the incident angles on the outermost off-axis deflection points on the deflecting surface 104a of the marginal rays of one outermost off-axis light flux and the other outermost off-axis light flux.

On the other hand, the characteristic is set such that the reflectivity is relatively small in the vicinity of 45.0° which is the incident angle on the on-axis deflection point on the deflecting surface 104a of the principal ray of the on-axis light flux.

In the light scanning apparatus 100 according to the present embodiment, the reflectivity of the deflecting surface 104a of the deflecting unit 104 does not vary linearly with respect to the incident angle, but varies in a curved manner according to the change in the scanning speed described above, as shown in FIG. 4.

This is to cancel a decrease in an exposure amount due to the increase in the scanning speed on the scanned surface 106.

Here, the ratio of the reflectivity at the outermost off-axis deflection point (second deflection point) on one side in the main scanning direction to that at the on-axis deflection point (first deflection point) on the deflecting surface 104a of the deflecting unit 104 is represented by $\Delta R_1$.

Further, the ratio of the reflectivity at the outermost off-axis deflection point (third deflection point) on the other side in the main scanning direction to that at the on-axis deflection point is represented by $\Delta R_2$.

At this time, the following conditional expressions (8) and (9) are satisfied in the light scanning apparatus 100 according to the present embodiment:

$$1.05 \leq |\Delta R_1| \leq 1.50 \qquad (8); \text{ and}$$

$$1.05 \leq |\Delta R_2| \leq 1.50 \qquad (9).$$

When the ratio of the reflectivity at the outermost off-axis deflection point to that at the on-axis deflection point increases so as to exceed the upper limit value of the conditional expression (8) or the conditional expression (9), it becomes difficult to form the reflection film with a film structure achieving such angle characteristic of reflectivity on the deflecting surface 104a.

On the other hand, when the ratio of the reflectivity at the outermost off-axis deflection point to that at the on-axis deflection point decreases so as to fall below the lower limit value of the conditional expression (8) or the conditional expression (9), it becomes difficult to sufficiently reduce the light amount unevenness on the scanned surface 106 caused by the nonuniform speed scanning characteristic as the light scanning apparatus 100 according to the present embodiment.

Further, it is preferred that the following conditional expressions (8a) and (9a) are satisfied in the light scanning apparatus 100 according to the present embodiment:

$$1.05 \leq |\Delta R_1| \leq 1.40 \qquad (8a); \text{ and}$$

$$1.05 \leq |\Delta R_2| \leq 1.40 \qquad (9a).$$

Furthermore, it is more preferred that the following conditional expressions (8b) and (9b) are satisfied in the light scanning apparatus 100 according to the embodiment:

$$1.10 \leq |\Delta R_1| \leq 1.35 \qquad (8b); \text{ and}$$

$$1.10 \leq |\Delta R_2| \leq 1.35 \qquad (9b).$$

Since $|\Delta R_1|=1.20$ and $|\Delta R_2|=1.18$, any of the conditional expressions (8) to (8b) and the conditional expressions (9) to (9b) is satisfied in the light scanning apparatus 100 according to the present embodiment.

Figure 5A:
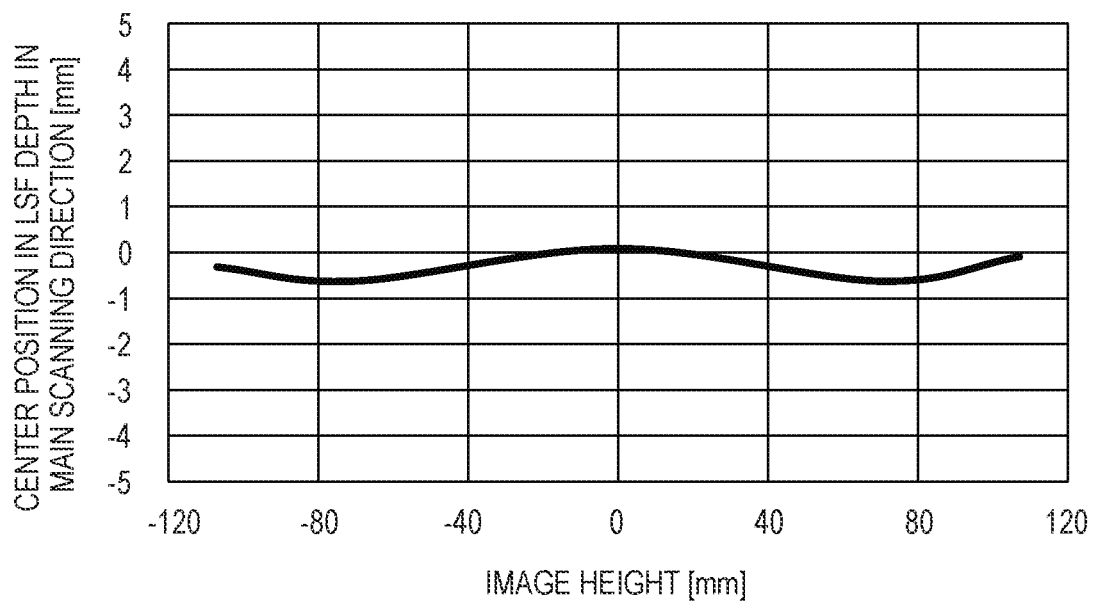
FIG. 5A is a graph showing an image height dependence of a center position in a LSF depth in a main scanning direction in the light scanning apparatus according to the first embodiment.
Figure 5B:
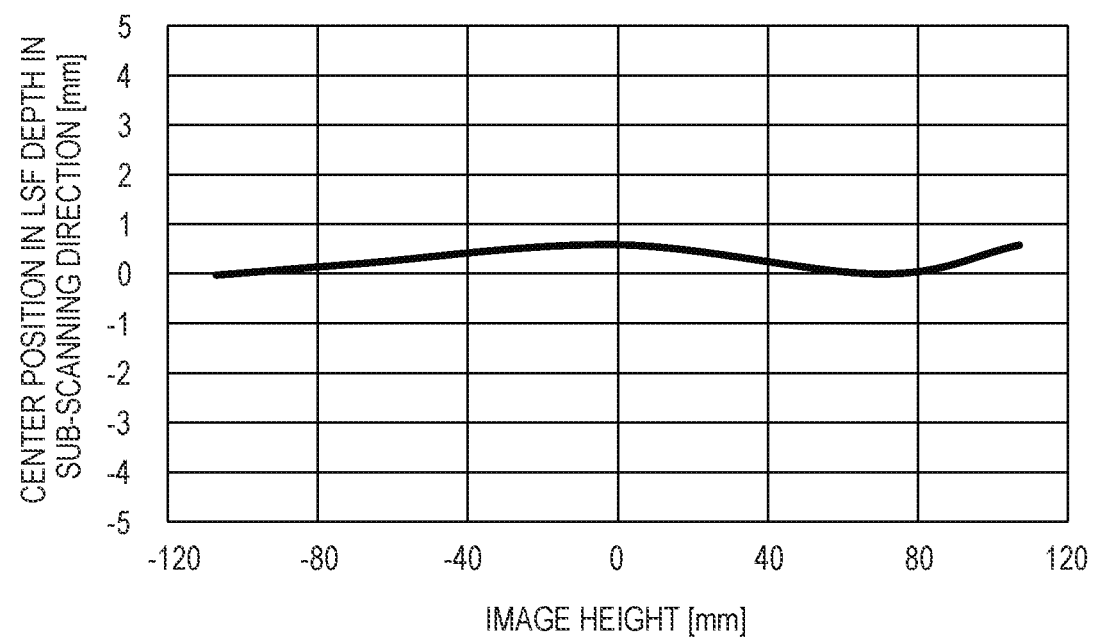
FIG. 5B is a graph showing an image height dependence of the center position in the LSF depth in a sub-scanning scanning direction in the light scanning apparatus according to the first embodiment.

FIGS. 5A and 5B show an image height dependence of a center position in LSF (Line Spread Function) depth in the main scanning direction and the sub-scanning direction in the light scanning apparatus 100 according to the present embodiment, respectively.

Here, the center position in LSF depth refers to a center position of a region between a front side allowable focus position and a rear side allowable focus position at each of which a LSF spot diameter is equal to or smaller than a predetermined size (slice level) when defocusing is performed in the optical axis direction of the imaging optical system 85 in the vicinity of the scanned surface 106.

Further, the LSF spot diameter in the main scanning direction refers to a width when a light amount profile obtained by integrating a spot profile in the sub-scanning direction at each image height is sliced at a position of 13.5% with respect to the maximum value thereof.

In addition, the LSF spot diameter in the sub-scanning direction refers to the width when the light amount profile obtained by integrating the spot profile in the main scanning direction at each image height is sliced at a position of 13.5% with respect to the maximum value thereof.

In the light scanning apparatus 100 according to the present embodiment, the slice level is set to 120 μm over the entire image height in both of the main scanning direction and the sub-scanning direction.

As shown in FIGS. 5A and 5B, in the light scanning apparatus 100 according to the present embodiment, the center position in LSF depth is within +1 mm over the entire image height in each of the main scanning direction and the sub-scanning direction, so that a good imaging performance can be achieved.

Figure 6:
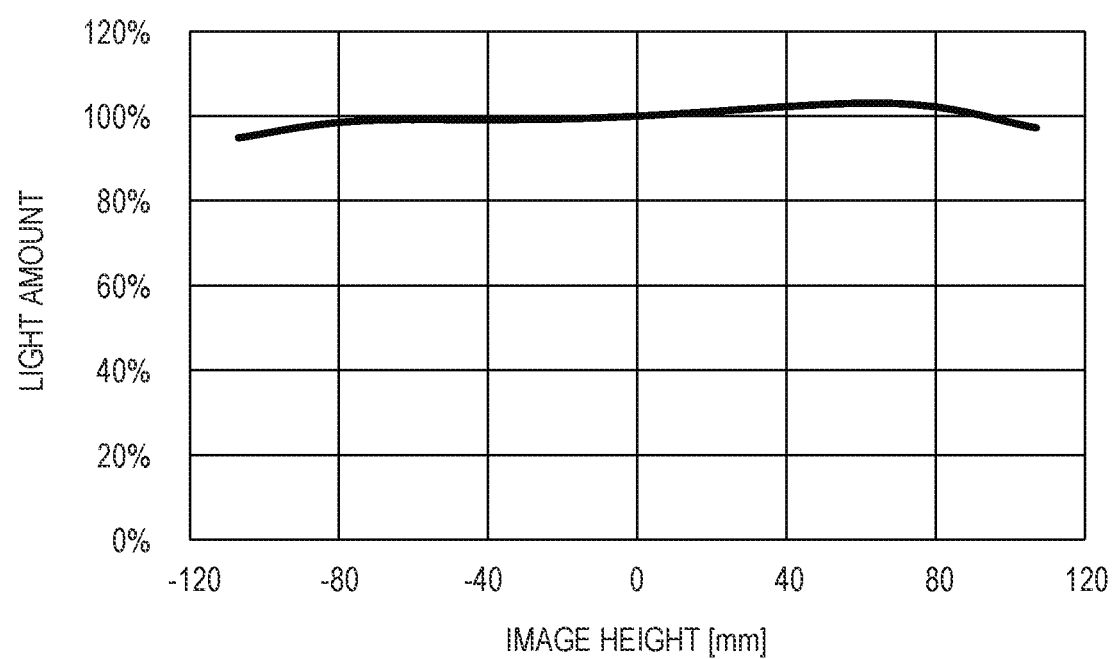
FIG. 6 is a graph showing a light amount distribution on a scanned surface by the light scanning apparatus according to the first embodiment.

FIG. 6 shows a light amount distribution on the scanned surface 106 by the light scanning apparatus 100 according to the present embodiment.

Note that the light amount distribution shown in FIG. 6 is normalized with the light amount at the on-axis image height as 100%.

As shown in FIG. 6, in the light amount distribution on the scanned surface 106 by the light scanning apparatus 100 according to the present embodiment, the light amount is maintained in a range of 100% about 5% over the entire image height, so that a substantially uniform light amount distribution can be achieved.

Figure 18A:
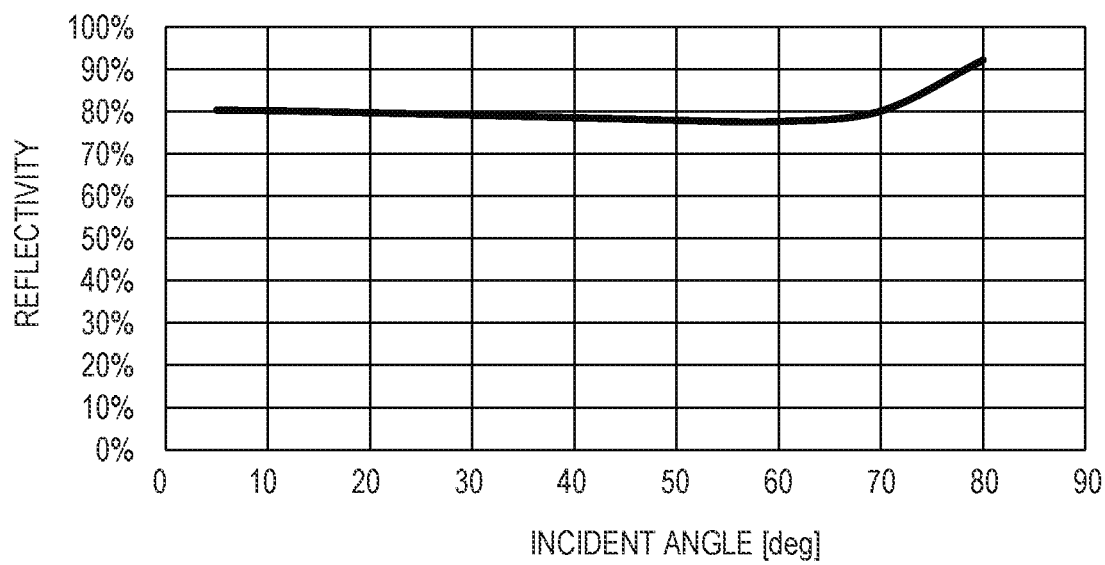
FIG. 18A is a graph showing an incident angle dependence of reflectivity of a deflecting surface in a deflecting unit included in a conventional light scanning apparatus.

FIG. 18A shows the incident angle dependence of the reflectivity of the deflecting surface of the deflecting unit provided in the conventional light scanning apparatus.

Figure 18B:
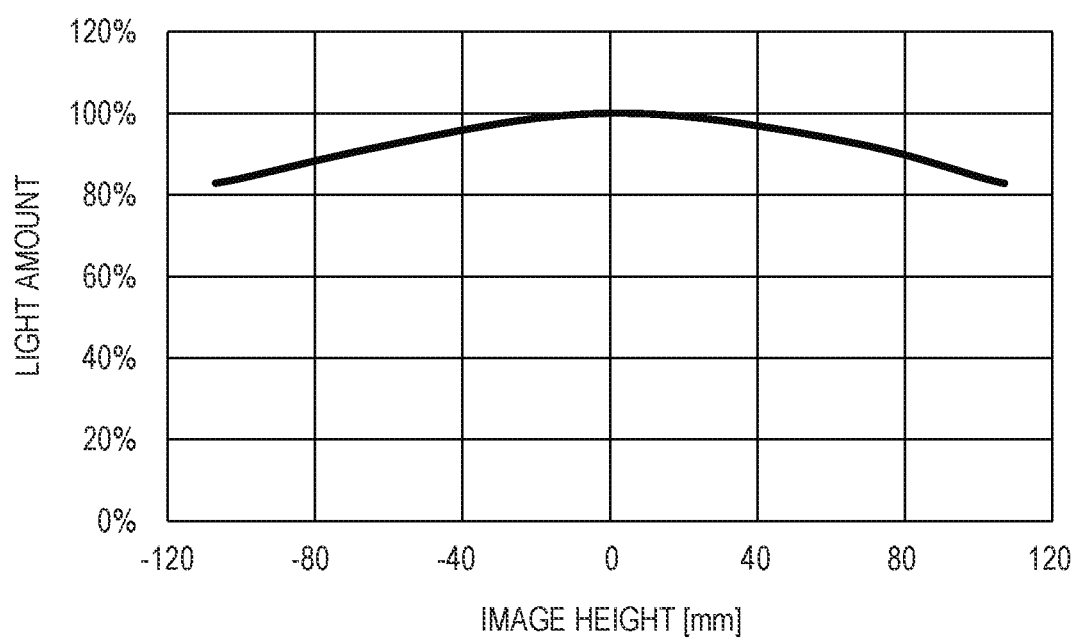
FIG. 18B is a graph showing a light amount distribution on a scanned surface by the conventional light scanning apparatus.

Further, FIG. 18B shows the light amount distribution on the scanned surface by the conventional light scanning apparatus.

The conventional light scanning apparatus herein has the same structure as that of the light scanning apparatus 100 according to the present embodiment except that a general aluminum polygon mirror is used instead of the deflecting unit 104.

As shown in FIG. 18A, the ratio $\Delta R_1$ of the reflectivity at one outermost off-axis deflection point to that at the on-axis deflection point is 1.02 in the conventional light scanning apparatus.

Further, the ratio $\Delta R_2$ of the reflectivity at the other outermost off-axis deflection point to that at the on-axis deflection point is 1.02.

As shown in FIG. 18B, the light amount decreases by about 17% which is the maximum at both of the outermost off-axis image heights with respect to the on-axis image height, so that the light amount unevenness on the scanned surface cannot be reduced.

In the light scanning apparatus 100 according to the present embodiment, it is preferred that at least one of the following conditional expressions (10) to (15) is satisfied:

$$1.05 \leq |\Delta Y_1| \leq 1.50; \qquad (10)$$

$$1.05 \leq |\Delta Y_2| \leq 1.50; \qquad (11)$$

-continued $$0.80 \le \left|\frac{\Delta Y_1}{\Delta R_1}\right| \le 1.20; \tag{12}$$

$$0.80 \le \left|\frac{\Delta Y_2}{\Delta R_2}\right| \le 1.20; \tag{13}$$

$$1.04 \le |\psi| \le 2.00; \text{ and} \tag{14}$$

$$0.34 \le |\theta_{ex}| \le 1.14. \tag{15}$$

Here, $\Delta Y_1$ represents a magnitude of the deviation of the partial magnification at the outermost off-axis image height (first outermost off-axis image height) at which the outermost off-axis light flux (first outermost off-axis light flux) corresponding to $\Delta R_1$ reaches, and $\Delta Y_2$ is the magnitude of the deviation of the partial magnification at the outermost off-axis image height (second outermost off-axis image height) at which the outermost off-axis light flux (second outermost off-axis light flux) corresponding to $\Delta R_2$ reaches.

Further, $\psi$ is an angle [radian] between the optical axis of the incident optical system 75 and that of the imaging optical system 85.

Furthermore, $\theta_{ex}$ is an angle [radian] at which the reflectivity of the deflecting surface 104a takes a minimum value in the incident angle dependence, in other words, an incident angle of the principal ray when it is incident on the deflection point having the smallest reflectivity among the deflection points on the deflecting surface 104a with respect to the principal rays of respective on-axis light flux and off-axis light fluxes.

When the deviation of the partial magnification in the light scanning apparatus 100 according to the present embodiment increases so as to exceed the upper limit value of the conditional expression (10) or the conditional expression (11), it becomes difficult to form a reflection film with the film structure which realizes the angle characteristic of reflectivity in the deflecting surface 104a for uniformizing the light amount distribution on the scanned surface 106.

On the other hand, when the deviation of the partial magnification in the light scanning apparatus 100 according to the present embodiment decreases so as to fall below the lower limit value of the conditional expression (10) or the conditional expression (11), the light scanning apparatus 100 approaches a uniform speed scanning system, so that an imaging performance deteriorates in a case where the imaging optical element 105 is arranged close to the deflecting unit 104.

Further, when the deviation of the partial magnification in the light scanning apparatus 100 according to the present embodiment increases or the ratio of the reflectivity at the outermost off-axis deflection point to that at the on-axis deflection point decreases so as to exceed the upper limit value of the conditional expression (12) or the conditional expression (13), a reduction in light amount due to the deviation of the partial magnification at the off-axis image height on the scanned surface 106 cannot be sufficiently corrected.

On the other hand, when the deviation of the partial magnification in the light scanning apparatus 100 according to the present embodiment decreases or the ratio of the reflectivity at the outermost off-axis deflection point to that at the on-axis deflection point increases so as to fall below the lower limit value of the conditional expression (12) or the conditional expression (13), the reduction in light amount due to the deviation of the partial magnification at the off-axis image height on the scanned surface 106 is excessively corrected, thereby causing an increase in light amount at the off-axis image height.

Furthermore, when the angle between the optical axis of the incident optical system 75 and that of the imaging optical system 85 increases so as to exceed the upper limit value of the conditional expression (14), the incident angle of the outermost off-axis light flux deflected so as to scan one outermost off-axis image height on the deflecting unit 104 becomes too small, so that the outermost off-axis light flux is vignetted on the deflecting surface 104a.

On the other hand, when the angle between the optical axis of the incident optical system 75 and that of the imaging optical system 85 decreases so as to fall below the lower limit value of the conditional expression (14), an optical path of the light flux passing through the incident optical system 75 and the imaging optical element 105 interfere with each other, so that it becomes difficult to secure the optical path of the synchronization detection optical system. Alternatively, the optical path of the light flux passing through the incident optical system 75 and the optical path of the light flux passing through the imaging optical system 85 so as to scan the off-axis image height on the side close to the incident optical system 75 interfere with each other, so that it becomes difficult to reduce the size of the light scanning apparatus 100.

In addition, when the angle at which the reflectivity of the deflecting surface 104a takes a minimum value in the incident angle dependence deviates from the incident angle at the axial deflection point so as to exceed the upper limit value or fall below the lower limit value in the conditional expression (15), the film structure for realizing the angle characteristic of reflectivity at the deflecting surface 104a for uniformizing the light amount distribution on the scanned surface 106 becomes complicated. Alternatively, an asymmetric component between an off-axis image height at one side and the off-axis image height at the other side becomes large in the light amount distribution on the scanned surface 106.

It is more preferred that at least one of the following conditional expressions (10a) to (15a) is satisfied in the light scanning apparatus 100 according to the present embodiment:

$$1.05 \le |\Delta Y_1| \le 1.40; \tag{10a}$$

$$1.05 \le |\Delta Y_2| \le 1.40; \tag{11a}$$

$$0.85 \le \left|\frac{\Delta Y_1}{\Delta R_1}\right| \le 1.20; \tag{12a}$$

$$0.85 \le \left|\frac{\Delta Y_2}{\Delta R_2}\right| \le 1.20; \tag{13a}$$

$$1.13 \le |\psi| \le 1.84; \text{ and} \tag{14a}$$

$$0.43 \le |\theta_{ex}| \le 1.05. \tag{15a}$$

It is still more preferred that at least one of the following conditional expressions (10b) to (15b) is satisfied in the light scanning apparatus 100 according to the present embodiment:

$$1.10 \leq |\Delta Y_1| \leq 1.40; \quad (10b)$$

$$1.10 \leq |\Delta Y_2| \leq 1.40; \quad (11b)$$

$$0.85 \leq \left|\frac{\Delta Y_1}{\Delta R_1}\right| \leq 1.15; \quad (12b)$$

$$0.85 \leq \left|\frac{\Delta Y_2}{\Delta R_2}\right| \leq 1.15; \quad (13b)$$

$$1.22 \leq |\psi| \leq 1.75; \text{ and} \quad (14b)$$

$$0.50 \leq |\theta_{ex}| \leq 1.00. \quad (15b)$$

In the light scanning apparatus 100 according to the present embodiment, $|\Delta Y_1|=1.29$ and $|\Delta Y_2|=1.29$, so that any of the conditional expressions (10) to (10b) and the conditional expressions (11) to (11b) is satisfied.

Further, in the light scanning apparatus 100 according to the present embodiment, $|\Delta Y_1/\Delta R_1|=1.07$ and $|\Delta Y_2/\Delta R_2|=1.09$, so that any of the conditional expressions (12) to (12b) and the conditional expressions (13) to (13b) is satisfied.

Furthermore, in the light scanning apparatus 100 according to the present embodiment, $|\psi|=1.57$ radians and $|\theta_{ex}|=0.83$ radians, so that any of the conditional expressions (14) to (14b) and the conditional expressions (15) to (15b) is satisfied.

As described above, in the light scanning apparatus 100 according to the present embodiment, the reflection film with the structure shown in Table 4 is provided on the deflecting surface 104a of the deflecting unit 104 in the structure of the optical system shown in Tables 1 to 3, so that it is possible to reduce the light amount unevenness on the scanned surface 106.

Note that a layer formed by using a metal material Al as a main component is used as the metal layer in the light scanning apparatus 100 according to the present embodiment, but the present invention is not limited thereto, and a layer formed by using copper, silver or gold as the main component may be used.

Further, the multilayer film for forming the reflection film provided on the deflecting surface 104a of the deflecting unit 104 includes, in order from the substrate side, a ground layer, a metal layer, a first low refractive index dielectric layer, a high refractive index dielectric layer and a second low refractive index dielectric layer in the light scanning apparatus 100 according to the present embodiment.

However, the present invention is not limited thereto, and the multilayer film for forming the reflection film provided on the deflecting surface 104a of the deflecting unit 104 may include, in order from the substrate side, the ground layer, the metal layer, a first high refractive index dielectric layer, a low refractive index dielectric layer and a second high refractive index dielectric layer.

Furthermore, $SiO_2$ is used as the low refractive index dielectric material for forming the low refractive index dielectric layer in the light scanning apparatus 100 according to the present embodiment, but the present invention is not limited thereto, and $MgF_2$ (magnesium fluoride) may be used, or both of $SiO_2$ and $MgF_2$ may be used.

In addition, $Ta_2O_5$ is used as the high refractive index dielectric material for forming the high refractive index dielectric layer in the light scanning apparatus 100 according to the present embodiment, but the present invention is not limited thereto, and any of $Nb_2O_5$ (niobium pentoxide), $TiO_2$ (titanium dioxide), $ZrO_2$ (zirconium oxide), $HfO_2$ (hafnium oxide) and $Al_2O_3$ (aluminum oxide) may be used. Further, the high refractive index dielectric layer may be formed by using a plurality of the above-described high refractive index dielectric materials.

Second Embodiment

Figure 7A:
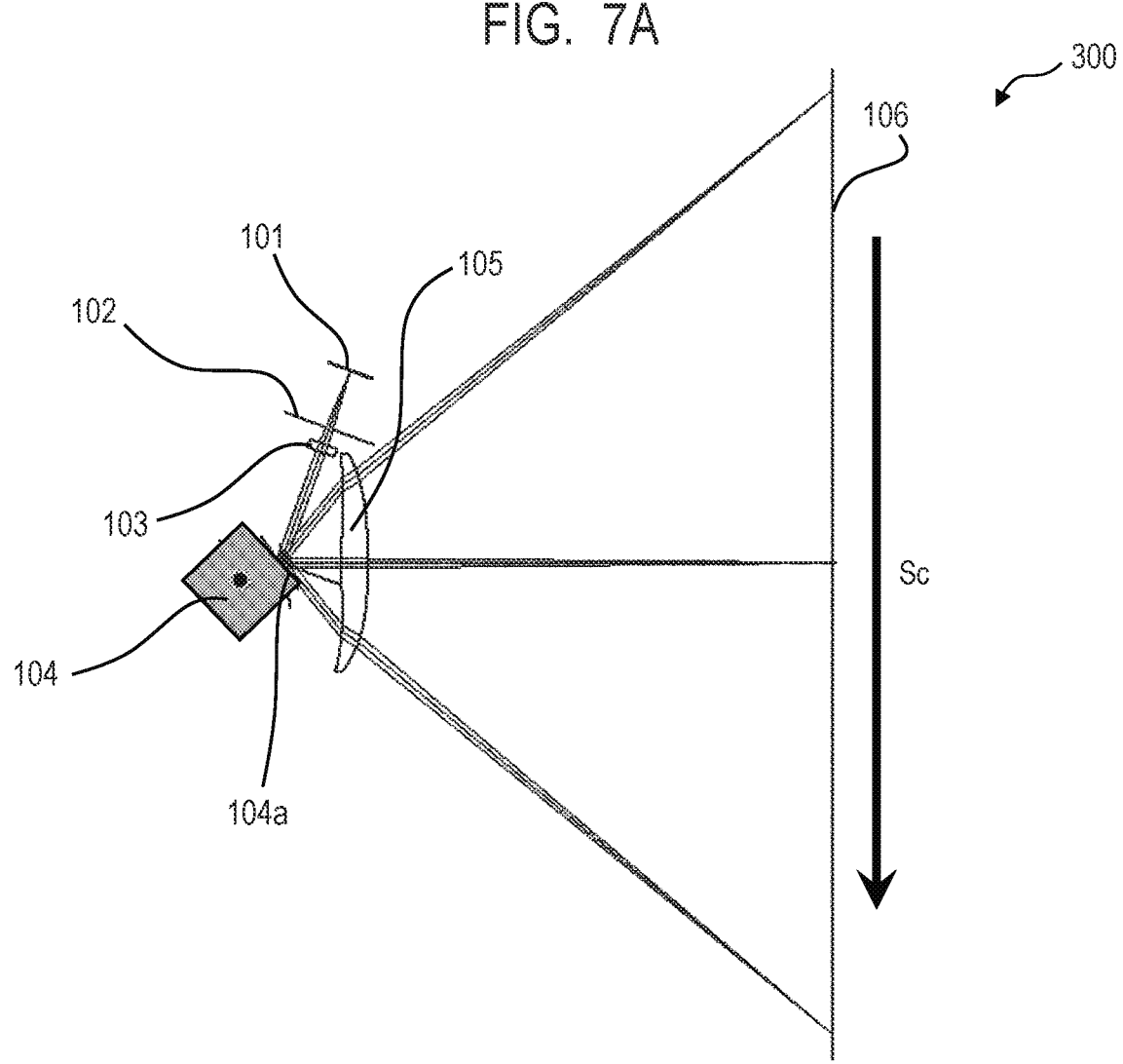
FIG. 7A is a schematic main scanning cross sectional view of a light scanning apparatus according to a second embodiment of the present invention.
Figure 7B:
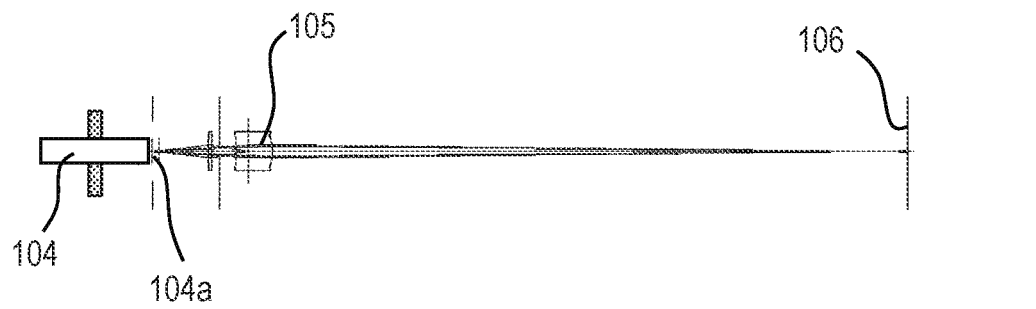
FIG. 7B is a partially enlarged schematic sub-scanning cross sectional view of the light scanning apparatus according to the second embodiment.

FIGS. 7A and 7B show a schematic main scanning cross sectional view and a partially enlarged schematic sub-scanning cross sectional view of a light scanning apparatus 300 according to a second embodiment of the present invention, respectively.

Note that the light scanning apparatus 300 according to the present embodiment has the same structure as that of the light scanning apparatus 100 according to the first embodiment, so that the same members are denoted by the same reference numerals, and description thereof will be omitted.

Further, various values of the light scanning apparatus 300 according to the present embodiment are shown in the following Tables 5, 6 and 7.

TABLE 5

| | Parameter [unit] | Value |
|---|---|---|
| Angle between an optical axis of the incident optical system 75 and that of the imaging optical system 85 | $\Psi$ [rad] | 1.222 |
| Width of the scanned surface 106 | W [mm] | ±107 |
| Imaging coefficient at the on-axis image height | KK [mm] | 109.232 |
| Scanning characteristic coefficient | $\alpha$ | 13.949 |
| Maximum scanning angle of view | $q_{max}$ [rad] | 0.890 |
| Number of deflecting surfaces in the deflecting unit 104 | | 4 |
| Position of rotation center of the deflecting unit 104 (in the optical axis direction of the imaging optical system 85) | Px [mm] | −5.89 |
| Position of rotation center of the deflecting unit 104 (in the main scanning direction) | Py [mm] | −4.11 |
| Diameter of circumscribed circle of the deflecting unit 104 (in the main scanning section) | [mm] | 10 |
| Diameters of the stop 102 (main scanning direction × sub-scanning direction) | Am × As [mm] | 1.644 × 1.606 |
| Length of optical path in the imaging optical system 85 | Tc [mm] | 125 |

TABLE 6

| Surface number | Surface | Surface interval | Refractive index (at λ = 780 nm) | Coordinates of vertex of optical surface | | | Direction cosine of optical axis of optical surface | | |
|---|---|---|---|---|---|---|---|---|---|
| | | | | tc(x) | tc(y) | tc(z) | gx(x) | gx(y) | gx(z) |
| 1 | Light source 101 | 0.250 | 1.516 | 15.904 | 43.696 | 0.000 | 0.342 | 0.940 | 0.000 |
| 2 | Cover glass of laser chip | 13.860 | 1.000 | 15.818 | 43.461 | 0.000 | 0.342 | 0.940 | 0.000 |
| 3 | Stop 102 | 3.720 | 1.000 | 11.078 | 30.437 | 0.000 | 0.342 | 0.940 | 0.000 |
| 4 | Incident surface of the incident optical element 103 | 2.000 | 1.535 | 9.806 | 26.941 | 0.000 | 0.342 | 0.940 | 0.000 |
| 5 | Exit surface of the incident optical element 103 | 26.670 | 1.000 | 9.122 | 25.062 | 0.000 | 0.342 | 0.940 | 0.000 |
| 6 | Deflecting surface 104a of the deflecting unit 104 (when deflecting the on-axis light flux) | 13.800 | 1.000 | 0.000 | 0.000 | 0.000 | 0.819 | 0.574 | 0.000 |
| 7 | Incident surface of the imaging optical element 105 | 6.000 | 1.535 | 13.800 | 0.000 | 0.000 | 1.000 | 0.000 | 0.000 |
| 8 | Exit surface of the imaging optical element 105 | 105.200 | 1.000 | 19.800 | 0.000 | 0.000 | 1.000 | 0.000 | 0.000 |
| 9 | Scanned surface 106 | — | 1.000 | 125.000 | 0.000 | 0.000 | 1.000 | 0.000 | 0.000 |

TABLE 7

Aspheric coefficients

| | Coefficients | Incident optical element 103 | | Imaging optical element 105 | |
|---|---|---|---|---|---|
| | | Incident surface | Exit surface | Incident surface | Exit surface |
| Meridional line | R | ∞ | 4.1500E+01 | 9.6522E+01 | −1.7530E+02 |
| | K | — | — | −2.2035E+01 | 4.0404E+01 |
| | B3 | — | — | 3.5224E−05 | 3.3616E−05 |
| | B4 | — | — | −2.3145E−05 | −1.0023E−05 |
| | B5 | — | — | 7.9339E−09 | −1.9068E−08 |
| | B6 | — | — | 4.5760E−08 | −1.0689E−09 |
| | B7 | — | — | 2.3676E−12 | 1.1126E−10 |
| | B8 | — | — | −4.6185E−11 | 2.0541E−11 |
| | B9 | — | — | −8.4991E−15 | −5.9288E−14 |
| | B10 | — | — | 1.6107E−14 | −1.7454E−14 |
| Sagittal line | r | ∞ | 1.2400E+01 | −2.4305E+01 | −7.0600E+00 |
| | E1 | — | — | −1.4313E−03 | −5.8176E−04 |
| | E2 | — | — | −1.9146E−06 | 1.6022E−04 |
| | E3 | — | — | 1.0521E−06 | −1.2687E−06 |
| | E4 | — | — | 1.5156E−07 | −6.2573E−07 |
| | E5 | — | — | 5.7739E−10 | 2.7199E−09 |
| | E6 | — | — | −3.7829E−10 | 1.2466E−09 |
| | E7 | — | — | −2.1198E−12 | 3.0195E−13 |
| | E8 | — | — | 1.3096E−13 | −1.1603E−12 |
| | E9 | — | — | −4.9673E−15 | −8.1776E−15 |
| | E10 | — | — | −3.5544E−16 | −6.9477E−17 |
| Additional shape | C3 | −2.6307E−02 | — | — | — |
| | C5 | −2.2101E−02 | — | — | — |

As shown in Table 5, the angle ψ between the optical axis of the incident optical system 75 and that of the imaging optical system 85 is 1.222 radians (about 70°) in the light scanning apparatus 300 according to the present embodiment.

Accordingly, the incident angle of the principal ray of the on-axis light flux on the on-axis deflection point on the deflecting unit 104 is about 35° in the light scanning apparatus 300 according to the present embodiment.

Figure 8:
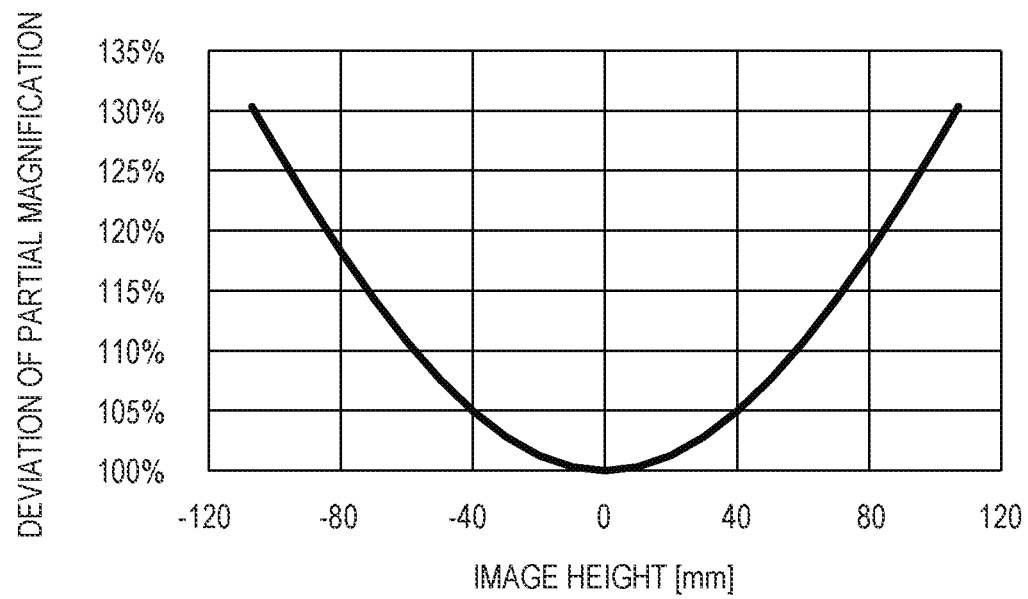
FIG. 8 is a graph showing an image height dependence of a deviation of partial magnification in the light scanning apparatus according to the second embodiment.

FIG. 8 shows an image height dependence of the deviation of the partial magnification in the light scanning apparatus 300 according to the present embodiment.

As shown in FIG. 8, the deviation of the partial magnification of about 130% which is the maximum occurs at the outermost off-axis image height with respect to the on-axis image height in the light scanning apparatus 300 according to the present embodiment.

Next, the structure of the reflection film provided on the deflecting surface 104a of the deflecting unit 104 provided in the light scanning apparatus 300 according to the present embodiment is shown in the following Table 8.

TABLE 8

| | Film material | Physical film thickness [nm] |
|---|---|---|
| 9 | $SiO_2$ | 446.79 |
| 8 | $Ta_2O_5$ | 531.88 |
| 7 | $SiO_2$ | 155.52 |
| 6 | $Ta_2O_5$ | 94.73 |
| 5 | $SiO_2$ | 252.74 |
| 4 | $Ta_2O_5$ | 154.83 |
| 3 | $SiO_2$ | 111.32 |
| 2 | Al | 100 |

TABLE 8-continued

| | Film material | Physical film thickness [nm] |
|---|---|---|
| 1 | SiO$_2$ | 150 |
| 0 | Base material | — |

As shown in Table 8, a reflection film formed by a multilayer film consisting of nine layers is provided on the deflecting surface 104a of the deflecting unit 104 provided in the light scanning apparatus 300 according to the present embodiment.

Specifically, a first layer made of a low refractive index dielectric material SiO$_2$ is formed as a ground layer (adhesion layer) for improving an adhesion without affecting an optical performance between a zeroth layer as a base material formed by a predetermined resin and a second layer corresponding to a metal layer.

Further, on the first layer, the multilayer film is formed by laminating the second layer made of a metal material Al as a main component as the metal layer, a third layer made of the low refractive index dielectric material SiO$_2$, a fourth layer made of a high refractive index dielectric material Ta$_2$O$_5$, a fifth layer made of the low refractive index dielectric material SiO$_2$, a sixth layer made of the high refractive index dielectric material Ta$_2$O$_5$, a seventh layer made of the low refractive index dielectric material SiO$_2$, an eighth layer made of the high refractive index dielectric material Ta$_2$O$_5$, and a ninth layer made of the low refractive index dielectric material SiO$_2$ as an outermost layer in this order.

Figure 9:
FIG. 9 is a graph showing an incident angle dependence of reflectivity of a deflecting surface in a deflecting unit included in the light scanning apparatus according to the second embodiment.

FIG. 9 shows an incident angle dependence of the reflectivity of the deflecting surface 104a of the deflecting unit 104 provided in the light scanning apparatus 300 according to the present embodiment. In FIG. 9, only the reflectivity of the P-polarized component is shown.

As described above, the incident angle of the principal ray of the on-axis light flux on the on-axis deflection point on the deflecting surface 104a is about 350 in the light scanning apparatus 300 according to the present embodiment.

Accordingly, as shown in FIG. 9, the reflection film formed by the multilayer film consisting of nine layers as described above is provided on the deflecting surface 104a of the deflecting unit 104 such that the angle at which the reflectivity takes a minimum is about 35° in the light scanning apparatus 300 according to the present embodiment.

Figure 10A:
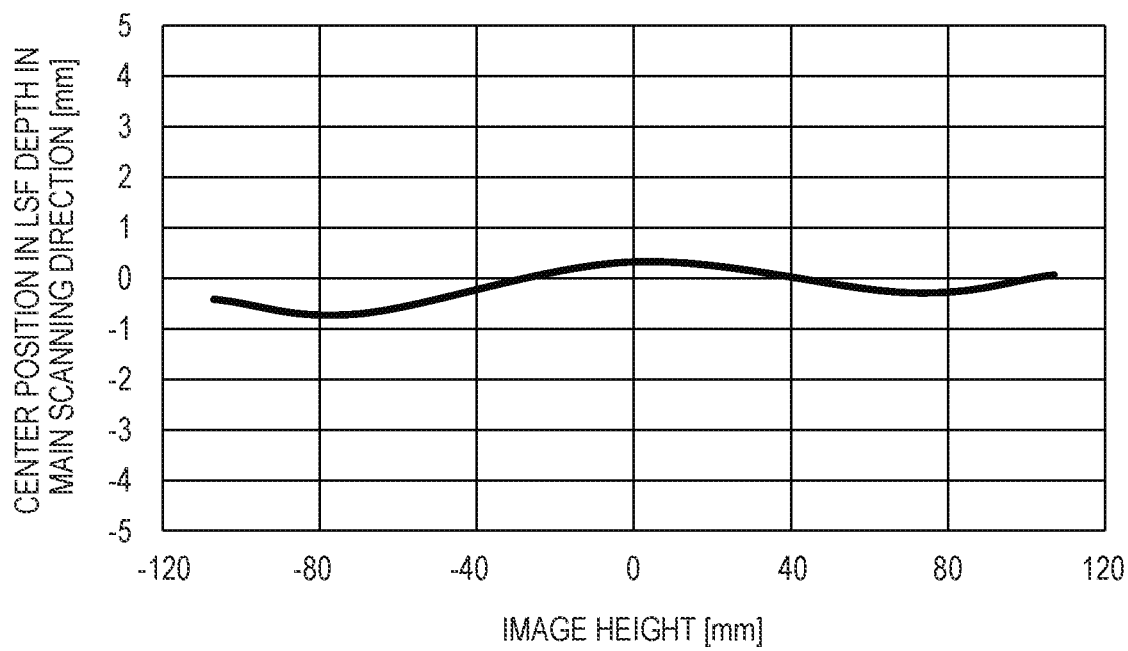
FIG. 10A is a graph showing an image height dependence of a center position in a LSF depth in a main scanning direction in the light scanning apparatus according to the second embodiment.
Figure 10B:
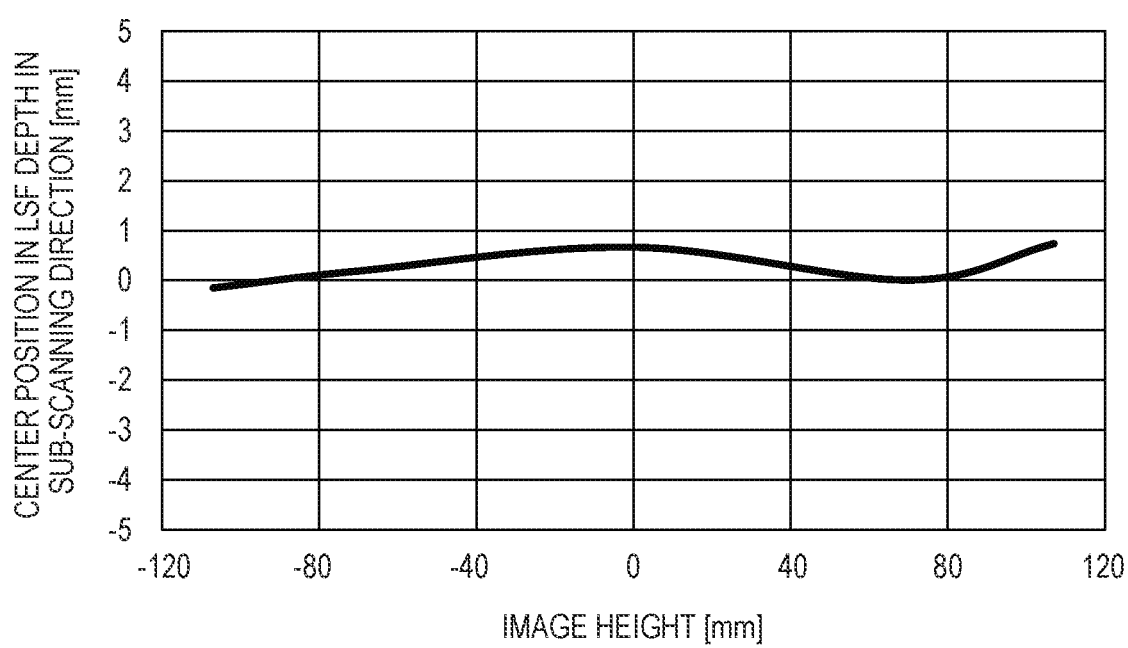
FIG. 10B is a graph showing an image height dependence of the center position in the LSF depth in a sub-scanning scanning direction in the light scanning apparatus according to the second embodiment.

FIGS. 10A and 10B show an image height dependence of the center position in LSF depth in the main scanning direction and the sub-scanning direction in the light scanning apparatus 300 according to the present embodiment, respectively.

As shown in FIGS. 10A and 10B, the center position in LSF depth is within ±1 mm over the entire image height in each of the main scanning direction and the sub-scanning direction, so that a good imaging performance can be achieved in the light scanning apparatus 300 according to the present embodiment.

Figure 11:
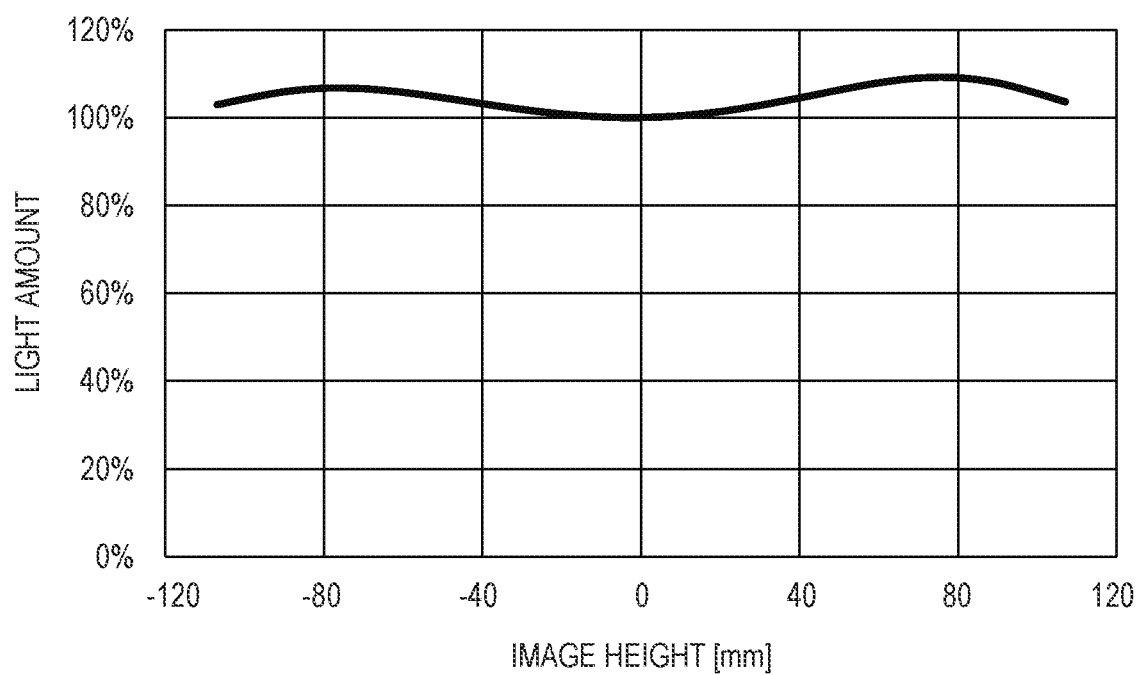
FIG. 11 is a graph showing a light amount distribution on a scanned surface by the light scanning apparatus according to the second embodiment.

FIG. 11 shows a light amount distribution on the scanned surface 106 by the light scanning apparatus 300 according to the present embodiment.

Note that the light amount distribution shown in FIG. 11 is normalized with the light amount at the on-axis image height as 100%.

As shown in FIG. 11, in the light amount distribution on the scanned surface 106 by the light scanning apparatus 300 according to the present embodiment, the light amount is maintained in a range between 100% and about 109% over the entire image height, so that a substantially uniform light amount distribution can be achieved.

In the light scanning apparatus 300 according to the present embodiment, $|\Delta R_1|=1.26$ and $|\Delta R_2|=1.26$, so that any of the conditional expressions (8) to (8b) and the conditional expressions (9) to (9b) is satisfied.

Further, $|\Delta Y_1|=1.30$ and $|\Delta Y_2|=1.30$, so that any of the conditional expressions (10) to (10b) and the conditional expressions (11) to (11b) is satisfied in the light scanning apparatus 300 according to the present embodiment.

Furthermore, $|\Delta Y_1/\Delta R_1|=1.03$ and $|\Delta Y_2/\Delta R_2|=1.03$, so that any of the conditional expressions (12) to (12b) and the conditional expressions (13) to (13b) is satisfied in the light scanning apparatus 300 according to the present embodiment.

In addition, $|\psi|=1.22$ radians and $|\theta_{ex}|=0.61$ radians, so that any of the conditional expressions (14) to (14b) and the conditional expressions (15) to (15b) is satisfied in the light scanning apparatus 300 according to the present embodiment.

As described above, the reflection film with the structure shown in Table 8 is provided on the deflecting surface 104a of the deflecting unit 104 in the structure of the optical system shown in Tables 5 to 7 in the light scanning apparatus 300 according to the present embodiment, so that it is possible to reduce the light amount unevenness on the scanned surface 106.

Third Embodiment

Figure 12A:
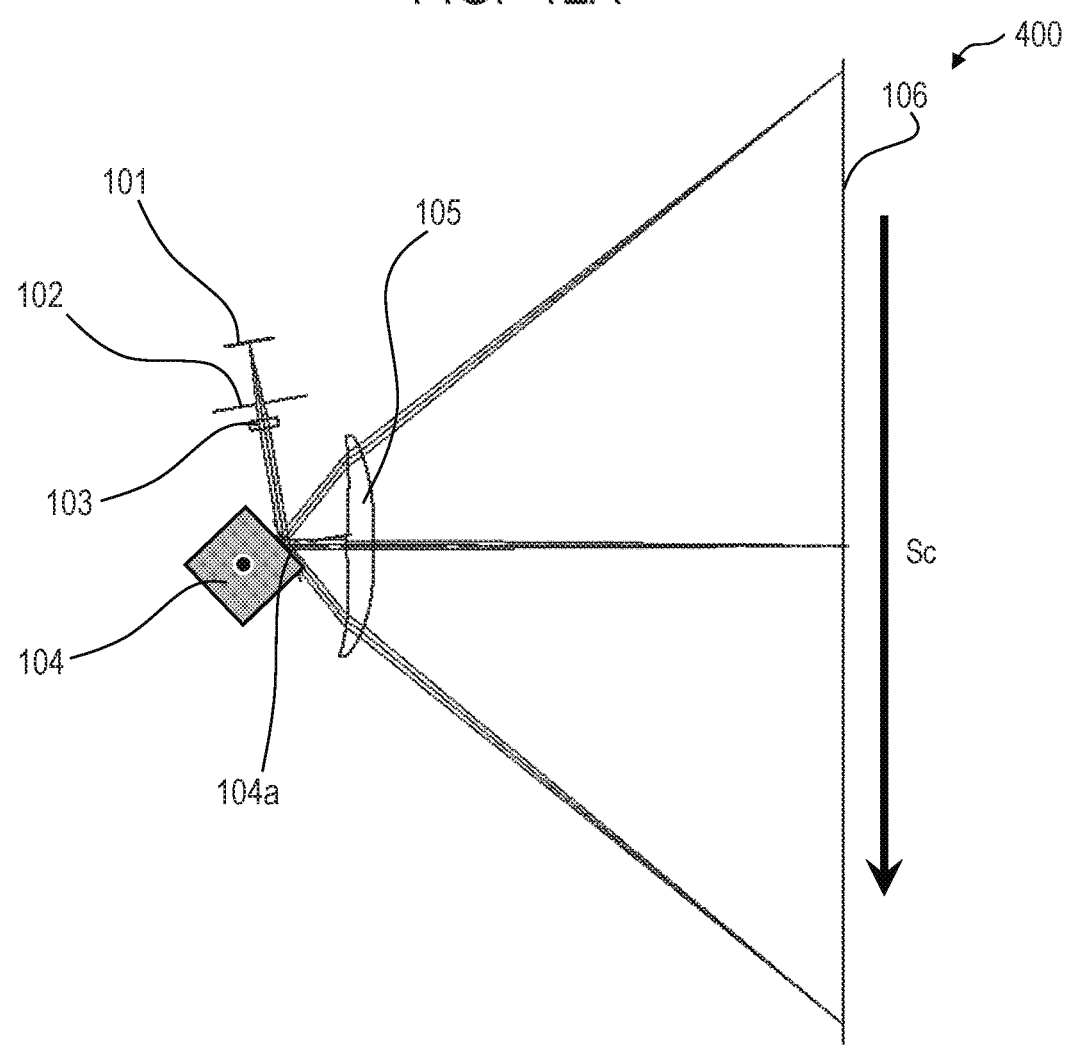
FIG. 12A is a schematic main scanning cross sectional view of a light scanning apparatus according to a third embodiment of the present invention.
Figure 12B:
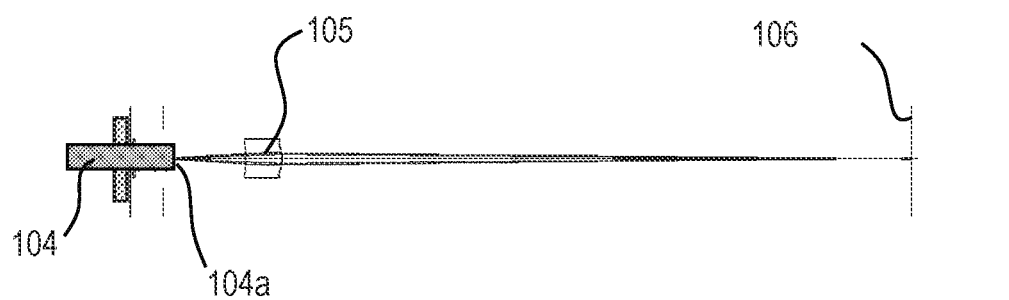
FIG. 12B is a partially enlarged schematic sub-scanning cross sectional view of the light scanning apparatus according to the third embodiment.

FIGS. 12A and 12B show a schematic main scanning cross sectional view and a partially enlarged schematic sub-scanning cross sectional view of a light scanning apparatus 400 according to a third embodiment of the present invention, respectively.

Note that the light scanning apparatus 400 according to the present embodiment has the same structure as that of the light scanning apparatus 100 according to the first embodiment, so that the same members are denoted by the same reference numerals, and description thereof will be omitted.

Further, various values of the light scanning apparatus 400 according to the present embodiment are shown in the following Tables 9, 10 and 11.

TABLE 9

| | Parameter [unit] | Value |
|---|---|---|
| Angle between an optical axis of the incident optical system 75 and that of the imaging optical system 85 | $\Psi$ [rad] | 1.745 |
| Width of the scanned surface 106 | W [mm] | ±107 |
| Imaging coefficient at the on-axis image height | KK [mm] | 109.843 |
| Scanning characteristic coefficient | $\alpha$ | 13.213 |
| Maximum scanning angle of view | $q_{max}$ [rad] | 0.890 |
| Number of deflecting surfaces in the deflecting unit 104 | | 4 |

TABLE 9-continued

|  | Parameter [unit] | Value |
|---|---|---|
| Position of rotation center of the deflecting unit 104 (in the optical axis direction of the imaging optical system 85) | Px [mm] | −5.89 |
| Position of rotation center of the deflecting unit 104 (in the main scanning direction) | Py [mm] | −4.11 |
| Diameter of circumscribed circle of the deflecting unit 104 (in the main scanning section) | [mm] | 10 |
| Diameters of the stop 102 (main scanning direction × sub-scanning direction) | Am × As [mm] | 1.644 × 1.606 |
| Length of optical path in the imaging optical system 85 | Tc [mm] | 125 |

TABLE 10

| Surface number | Surface | Surface interval | Refractive index (at λ = 780 nm) | Coordinates of vertex of optical surface | | | Direction cosine of optical axis of optical surface | | |
|---|---|---|---|---|---|---|---|---|---|
|  |  |  |  | tc(x) | tc(y) | tc(z) | gx(x) | gx(y) | gx(z) |
| 1 | Light source 101 | 0.250 | 1.516 | −8.075 | 45.794 | 0.000 | −0.174 | 0.985 | 0.000 |
| 2 | Cover glass of laser chip | 13.860 | 1.000 | −8.031 | 45.547 | 0.000 | −0.174 | 0.985 | 0.000 |
| 3 | Stop 102 | 3.720 | 1.000 | −5.624 | 31.898 | 0.000 | −0.174 | 0.985 | 0.000 |
| 4 | Incident surface of the incident optical element 103 | 2.000 | 1.535 | −4.978 | 28.234 | 0.000 | −0.174 | 0.985 | 0.000 |
| 5 | Exit surface of the incident optical element 103 | 26.670 | 1.000 | −4.631 | 26.265 | 0.000 | −0.174 | 0.985 | 0.000 |
| 6 | Deflecting surface 104a of the deflecting unit 104 (when deflecting the on-axis light flux) | 13.800 | 1.000 | 0.000 | 0.000 | 0.000 | 0.643 | 0.766 | 0.000 |
| 7 | Incident surface of the imaging optical element 105 | 6.000 | 1.535 | 13.800 | 0.000 | 0.000 | 1.000 | 0.000 | 0.000 |
| 8 | Exit surface of the imaging optical element 105 | 105.200 | 1.000 | 19.800 | 0.000 | 0.000 | 1.000 | 0.000 | 0.000 |
| 9 | Scanned surface 106 | — | 1.000 | 125.000 | 0.000 | 0.000 | 1.000 | 0.000 | 0.000 |

TABLE 11

| | | Aspheric coefficients | | | |
|---|---|---|---|---|---|
| | | Incident optical element 103 | | Imaging optical element 105 | |
| | Coefficients | Incident surface | Exit surface | Incident surface | Exit surface |
| Meridional line | R | ∞ | 4.1500E+01 | 9.9804E+01 | −1.7852E+02 |
| | K | — | — | −1.3857E+01 | 3.5248E+01 |
| | B3 | — | — | 3.7017E−05 | 2.2717E−05 |
| | B4 | — | — | −2.3668E−05 | −1.0971E−05 |
| | B5 | — | — | 1.7452E−08 | 1.7891E−08 |
| | B6 | — | — | 4.5046E−08 | 1.9021E−10 |
| | B7 | — | — | −2.8171E−12 | 5.9792E−11 |
| | B8 | — | — | −4.6012.E−11 | 1.9231E−11 |
| | B9 | — | — | −1.0489E−14 | −2.1503E−14 |
| | B10 | — | — | 1.6493E−14 | −1.9718E−14 |
| Sagittal line | r | ∞ | 1.2400E+01 | −2.5651E+01 | −6.9175E+00 |
| | E1 | — | — | −1.3954E−03 | −9.9062E−04 |
| | E2 | — | — | −5.5879E−06 | 1.5936E−04 |
| | E3 | — | — | 8.0622E−07 | 2.4836E−07 |
| | E4 | — | — | 1.5036E−07 | −6.1519E−07 |
| | E5 | — | — | 2.3162E−09 | −1.0950E−09 |
| | E6 | — | — | −3.4561E−10 | 1.2218E−09 |
| | E7 | — | — | −2.7439E−12 | 3.8412E−12 |
| | E8 | — | — | 2.6094E−13 | −1.1163E−12 |
| | E9 | — | — | 4.9306E−15 | −4.8575E−17 |
| | E10 | — | — | −4.0201E−16 | −2.5912.E−17 |
| Additional shape | C3 | −2.5945E−02 | — | — | — |
| | C5 | −2.2219E−02 | — | — | — |

As shown in Table 9, the angle ψ between the optical axis of the incident optical system 75 and that of the imaging optical system 85 is 1.745 radians (about 100°) in the light scanning apparatus 400 according to the present embodiment.

Accordingly, the incident angle of the principal ray of the on-axis light flux on the on-axis deflection point on the deflecting unit 104 is about 50° in the light scanning apparatus 400 according to the present embodiment.

Figure 13:
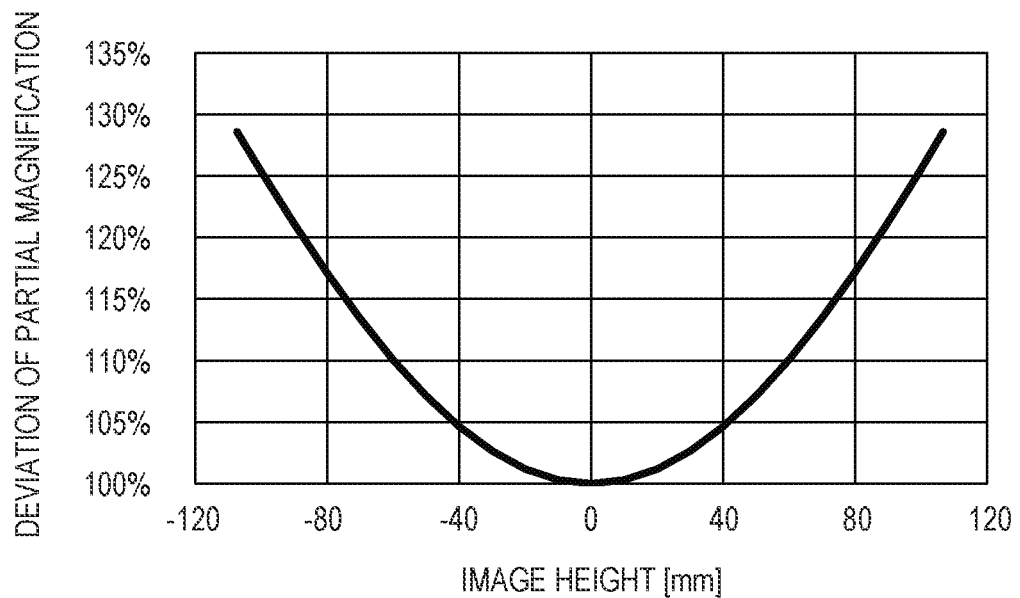
FIG. 13 is a graph showing an image height dependence of a deviation of partial magnification in the light scanning apparatus according to the third embodiment.

FIG. 13 shows an image height dependence of the deviation of the partial magnification in the light scanning apparatus 400 according to the present embodiment.

As shown in FIG. 13, the deviation of the partial magnification of about 129% which is the maximum occurs at the outermost off-axis image height with respect to the on-axis image height in the light scanning apparatus 400 according to the present embodiment.

Next, the structure of the reflection film provided on the deflecting surface 104a of the deflecting unit 104 provided in the light scanning apparatus 400 according to the present embodiment is shown in the following Table 12.

TABLE 12

|   | Film material | Physical film thickness [nm] |
|---|---|---|
| 9 | $SiO_2$ | 134.72 |
| 8 | $Ta_2O_5$ | 178.53 |
| 7 | $SiO_2$ | 154.39 |
| 6 | $Ta_2O_5$ | 489.63 |
| 5 | $SiO_2$ | 120.89 |
| 4 | $Ta_2O_5$ | 245.13 |
| 3 | $SiO_2$ | 141.45 |
| 2 | Al | 100 |
| 1 | $SiO_2$ | 150 |
| 0 | Base material | — |

As shown in Table 12, a reflection film formed by a multilayer film consisting of nine layers is provided on the deflecting surface 104a of the deflecting unit 104 provided in the light scanning apparatus 400 according to the present embodiment.

Specifically, a first layer made of a low refractive index dielectric material $SiO_2$ is formed as a ground layer (adhesion layer) for improving an adhesion without affecting an optical performance between a zeroth layer as a base material formed by a predetermined resin and a second layer corresponding to a metal layer.

Further, on the first layer, the multilayer film is formed by laminating the second layer made of a metal material Al as a main component as the metal layer, a third layer made of the low refractive index dielectric material $SiO_2$, a fourth layer made of a high refractive index dielectric material $Ta_2O_5$, a fifth layer made of the low refractive index dielectric material $SiO_2$, a sixth layer made of the high refractive index dielectric material $Ta_2O_5$, a seventh layer made of the low refractive index dielectric material $SiO_2$, an eighth layer made of the high refractive index dielectric material $Ta_2O_5$, and a ninth layer made of the low refractive index dielectric material $SiO_2$ as an outermost layer in this order.

Figure 14:
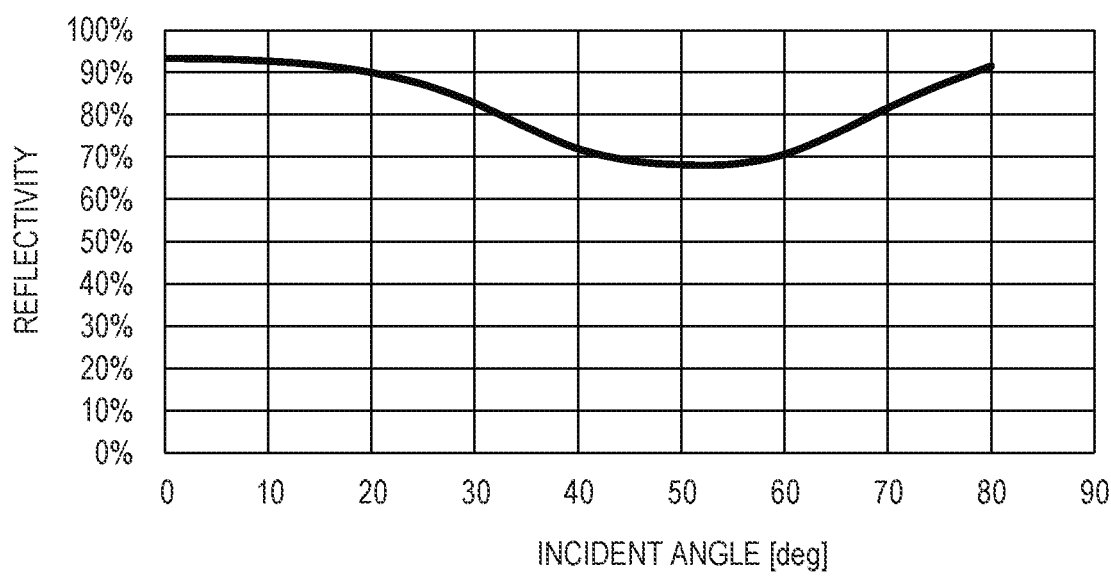
FIG. 14 is a graph showing an incident angle dependence of reflectivity of a deflecting surface in a deflecting unit included in the light scanning apparatus according to the third embodiment.

FIG. 14 shows an incident angle dependence of the reflectivity of the deflecting surface 104a of the deflecting unit 104 provided in the light scanning apparatus 400 according to the present embodiment. In FIG. 14, only the reflectivity of the P-polarized component is shown.

As described above, the incident angle of the principal ray of the on-axis light flux on the on-axis deflection point on the deflecting surface 104a is about 50° in the light scanning apparatus 400 according to the present embodiment.

Accordingly, as shown in FIG. 14, the reflection film formed by the multilayer film consisting of nine layers as described above is provided on the deflecting surface 104a of the deflecting unit 104 such that the angle at which the reflectivity takes a minimum is about 50° in the light scanning apparatus 400 according to the present embodiment.

Figure 15A:
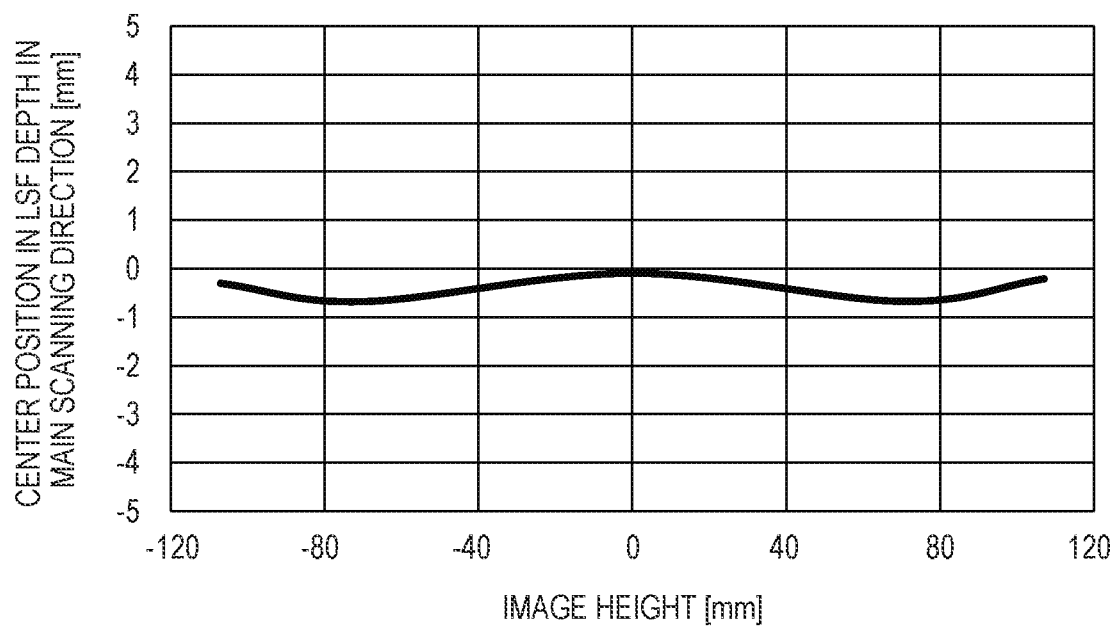
FIG. 15A is a graph showing an image height dependence of a center position in a LSF depth in a main scanning direction in the light scanning apparatus according to the third embodiment.
Figure 15B:
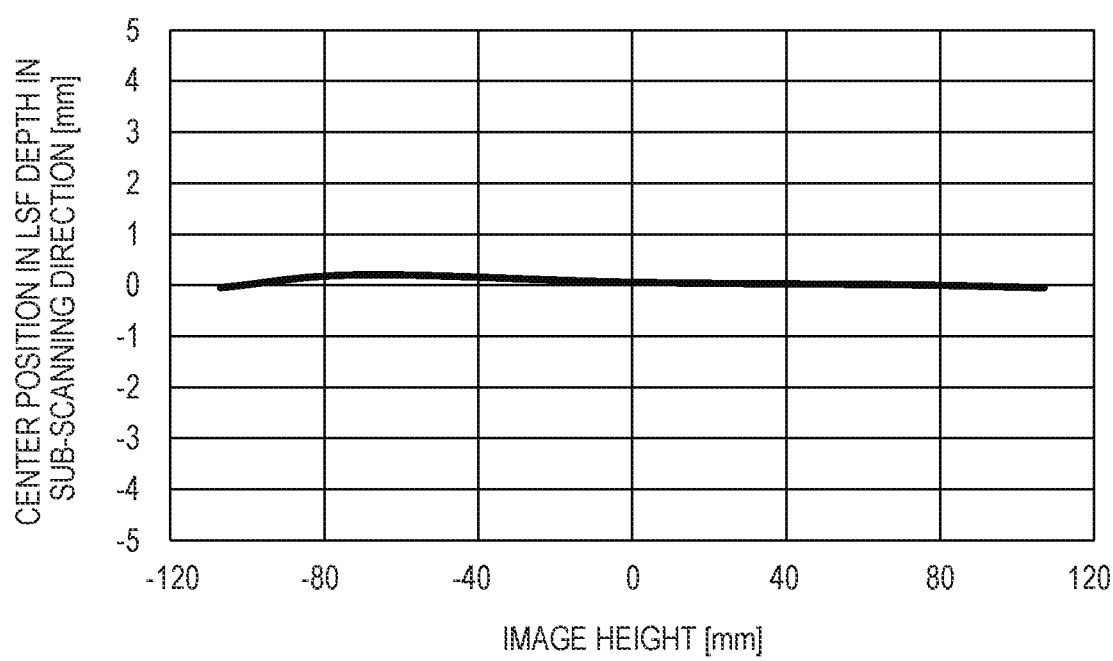
FIG. 15B is a graph showing an image height dependence of the center position in the LSF depth in a sub-scanning scanning direction in the light scanning apparatus according to the third embodiment.

FIGS. 15A and 15B show an image height dependence of the center position in LSF depth in the main scanning direction and the sub-scanning direction in the light scanning apparatus 400 according to the present embodiment, respectively.

As shown in FIGS. 15A and 15B, the center position in LSF depth is within ±1 mm over the entire image height in each of the main scanning direction and the sub-scanning direction, so that a good imaging performance can be achieved in the light scanning apparatus 400 according to the present embodiment.

Figure 16:
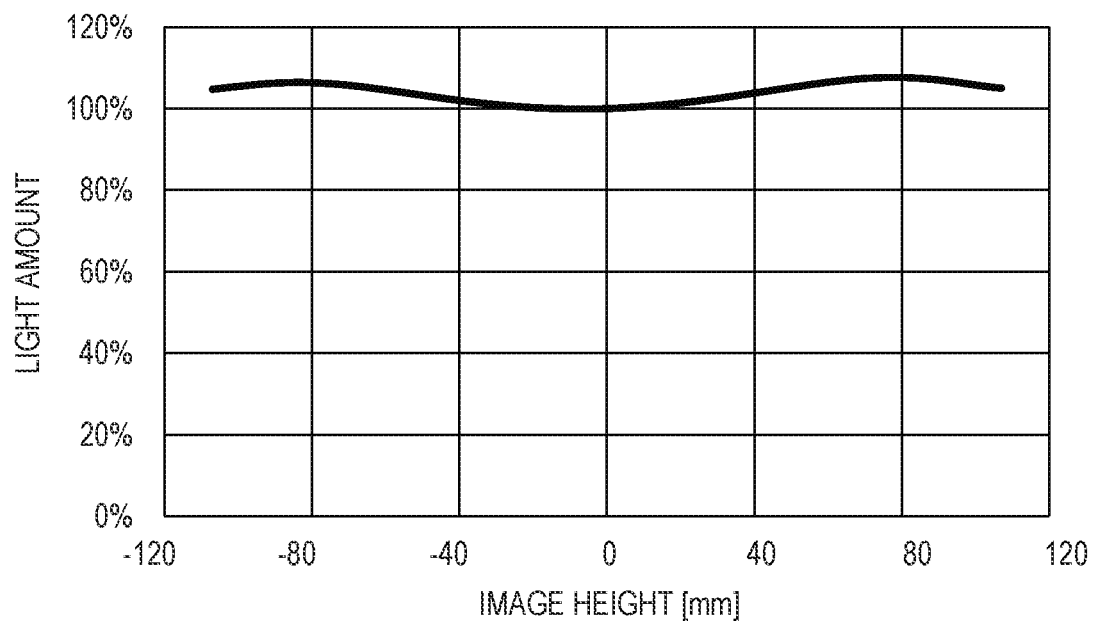
FIG. 16 is a graph showing a light amount distribution on a scanned surface by the light scanning apparatus according to the third embodiment.

FIG. 16 shows a light amount distribution on the scanned surface 106 by the light scanning apparatus 400 according to the present embodiment.

Note that the light amount distribution shown in FIG. 16 is normalized with the light amount at the on-axis image height as 100%.

As shown in FIG. 16, in the light amount distribution on the scanned surface 106 by the light scanning apparatus 400 according to the present embodiment, the light amount is maintained in a range between about 100% and about 108% over the entire image height, so that a substantially uniform light amount distribution can be achieved.

In the light scanning apparatus 400 according to the present embodiment, $|\Delta R_1|=1.32$ and $|\Delta R_2|=1.28$, so that any of the conditional expressions (8) to (8b) and the conditional expressions (9) to (9b) is satisfied.

Further, $|\Delta Y_1|=1.29$ and $|\Delta Y_2|=1.29$, so that any of the conditional expressions (10) to (10b) and the conditional expressions (11) to (11b) is satisfied in the light scanning apparatus 400 according to the present embodiment.

Furthermore, $|\Delta Y_1/\Delta R_1|=0.97$ and $|\Delta Y_2/\Delta R_2|=1.01$, so that any of the conditional expressions (12) to (12b) and the conditional expressions (13) to (13b) is satisfied in the light scanning apparatus 400 according to the present embodiment.

In addition, $|\psi|=1.75$ radians and $|\theta_{ex}|=0.92$ radians, so that any of the conditional expressions (14) to (14b) and the conditional expressions (15) to (15b) is satisfied in the light scanning apparatus 400 according to the present embodiment.

As described above, the reflection film with the structure shown in Table 12 is provided on the deflecting surface 104a of the deflecting unit 104 in the structure of the optical system shown in Tables 9 to 11 in the light scanning apparatus 400 according to the present embodiment, so that it is possible to reduce the light amount unevenness on the scanned surface 106.

Values corresponding to the conditional expressions (8) to (15) in respective light scanning apparatuses according to the first to third embodiments are shown in the following Table 13.

TABLE 13

| Conditional Expression | | First Embodiment | Second Embodiment | Third Embodiment |
|---|---|---|---|---|
| (8): $1.05 \leq |\Delta R_1| \leq 1.50$ <br> (8a): $1.05 \leq |\Delta R_1| \leq 1.40$ <br> (8b): $1.10 \leq |\Delta R_1| \leq 1.35$ | $|\Delta R_1|$ | 1.20 | 1.26 | 1.32 |
| (9): $1.05 \leq |\Delta R_2| \leq 1.50$ <br> (9a): $1.05 \leq |\Delta R_2| \leq 1.40$ <br> (9b): $1.10 \leq |\Delta R_2| \leq 1.35$ | $|\Delta R_2|$ | 1.18 | 1.26 | 1.28 |
| (10): $1.05 \leq |\Delta Y_1| \leq 1.50$ <br> (10a): $1.05 \leq |\Delta Y_1| \leq 1.40$ <br> (10b): $1.10 \leq |\Delta Y_1| \leq 1.40$ | $|\Delta Y_1|$ | 1.29 | 1.30 | 1.29 |
| (11): $1.05 \leq |\Delta Y_2| \leq 1.50$ <br> (11a): $1.05 \leq |\Delta Y_2| \leq 1.40$ <br> (11b): $1.10 \leq |\Delta Y_2| \leq 1.40$ | $|\Delta Y_2|$ | 1.29 | 1.30 | 1.29 |
| (12): $0.80 \leq \left|\frac{\Delta Y_1}{\Delta R_1}\right| \leq 1.20$ <br> (12a): $0.85 \leq \left|\frac{\Delta Y_1}{\Delta R_1}\right| \leq 1.20$ <br> (12b): $0.85 \leq \left|\frac{\Delta Y_1}{\Delta R_1}\right| \leq 1.15$ | $\left|\frac{\Delta Y_1}{\Delta R_1}\right|$ | 1.07 | 1.03 | 0.97 |
| (13): $0.80 \leq \left|\frac{\Delta Y_2}{\Delta R_2}\right| \leq 1.20$ <br> (13a): $0.85 \leq \left|\frac{\Delta Y_2}{\Delta R_2}\right| \leq 1.20$ <br> (13b): $0.85 \leq \left|\frac{\Delta Y_2}{\Delta R_2}\right| \leq 1.15$ | $\left|\frac{\Delta Y_2}{\Delta R_2}\right|$ | 1.09 | 1.03 | 1.01 |
| (14): $1.04 \leq |\psi| \leq 2.00$ <br> (14a): $1.13 \leq |\psi| \leq 1.84$ <br> (14b): $1.22 \leq |\psi| \leq 1.75$ | $|\psi|$ [rad] | 1.57 | 1.22 | 1.75 |
| (15): $0.34 \leq |\theta_{ex}| \leq 1.14$ <br> (15a): $0.43 \leq |\theta_{ex}| \leq 1.05$ <br> (15b): $0.50 \leq |\theta_{ex}| \leq 1.00$ | $|\theta_{ex}|$ [rad] | 0.83 | 0.61 | 0.92 |

Although the preferred embodiments have been described above, the present invention is not limited to these embodiments, and various modifications and changes can be made within the scope of the present invention.

[Image Forming Apparatus]

Figure 17:
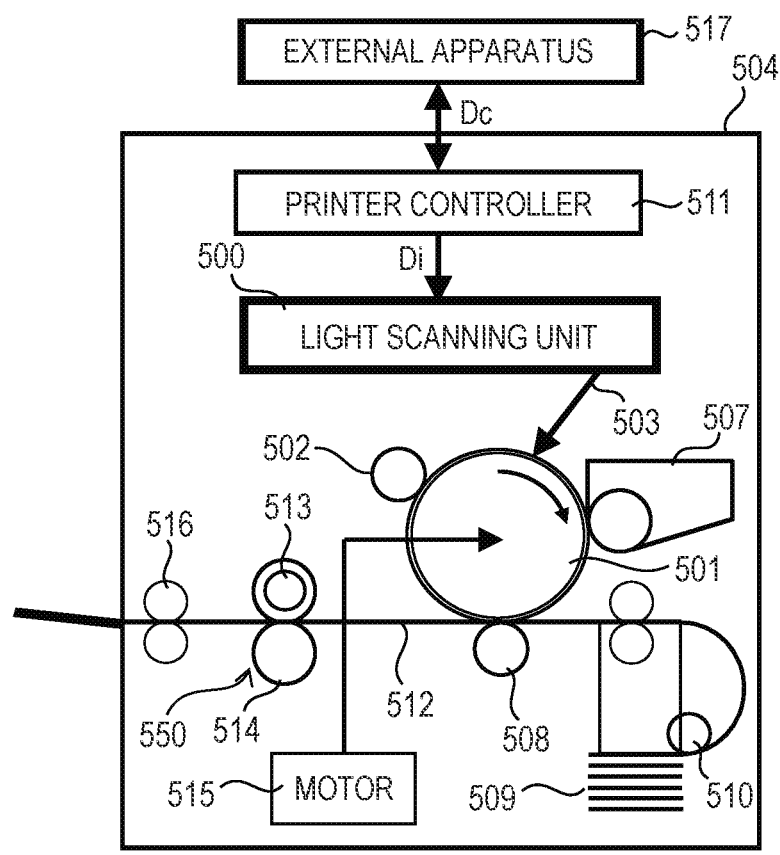
FIG. 17 is a sub-scanning cross sectional view of a main portion of an image forming apparatus according to the present invention.

FIG. 17 shows a sub-scanning cross sectional view of a main part of an image forming apparatus 504 including the light scanning unit 50) corresponding to the light scanning apparatus according to any one of the first to third embodiments of the present invention.

Code data Dc is input to the image forming apparatus 504 from an external apparatus 517, such as a personal computer. The input code data Dc is converted into image data (dot data) Di by a printer controller 511 in the image forming apparatus 504. The converted image data Di is input to the light scanning unit 500. A light beam 503 modulated in accordance with the image data Di is emitted from the light scanning unit 500, and a photosensitive surface of a photosensitive drum 501 is scanned in the main scanning direction by the light beam 503.

The photosensitive drum 501 serving as an electrostatic latent image carrier (photosensitive body) is rotated clockwise by a motor 515. With this rotation, the photosensitive surface of the photosensitive drum 501 moves in the sub-scanning direction perpendicular to the main scanning direction with respect to the light beam 503. A charging roller 502 for uniformly charging the surface of the photosensitive drum 501 is provided above the photosensitive drum 501 so as to abut on the surface. The surface of the photosensitive drum 501 charged by the charging roller 502 is irradiated with the light beam 503 scanned by the light scanning unit 500.

As described above, the light beam 503 is modulated based on the image data Di, and an electrostatic latent image is formed on the surface of the photosensitive drum 501 by irradiating the light beam 503. The formed electrostatic latent image is developed as a toner image by a developing unit 507 arranged on a further downstream side in the rotational direction of the irradiated position of the light beam 503 on the photosensitive drum 501 so as to abut on the photosensitive drum 501.

The toner image developed by the developing unit 507 is transferred onto a sheet 512 as a transferred material by a transferring roller 508 (transferring unit) arranged below the photosensitive drum 501 so as to face the photosensitive drum 501. Although the sheet 512 is stored in a sheet cassette 509 in front of the photosensitive drum 501 (right side in FIG. 17), the sheet 512 can be manually fed. A sheet feeding roller 510 is arranged at an end portion of the sheet cassette 509, and the sheet 512 in the sheet cassette 509 is fed to a conveying path.

The sheet 512 onto which the unfixed toner image has been transferred as described above is conveyed to a fixing unit 550 arranged behind the photosensitive drum 501 (left side in FIG. 17). The fixing unit 550 is formed by a fixing roller 513 having a fixing heater (not shown) therein, and a pressing roller 514 arranged so as to press against the fixing roller 513. The unfixed toner image on the sheet 512 is fixed by heating the sheet 512 conveyed from the transferring roller 508 with pressing the sheet 512 by a pressing portion between the fixing roller 513 and the pressing roller 514. Further, a discharging roller 516 is arranged behind the fixing unit 550, and the fixed sheet 512 is discharged to an outside of the image forming apparatus 504.

Note that the printer controller 511 controls each unit in the image forming apparatus 504 such as the motor 515, and a polygon motor in the light scanning unit 500 or the like in addition to the above-described data conversion.

According to the present invention, a light scanning apparatus capable of reducing the light amount unevenness on the scanned surface with a small and simple structure and an image forming apparatus including the light scanning apparatus can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-140602, filed Aug. 31, 2021, which is hereby incorporated by reference herein in its entirety.

What is claimed is:

1. A light scanning apparatus, comprising:
   a deflecting unit configured to deflect a light flux to scan a scanned surface in a main scanning direction; and
   an imaging optical system configured to guide the light flux deflected by the deflecting unit to the scanned surface and to have different partial magnifications in the main scanning direction between an on-axis image height and an outermost off-axis image height,
   wherein, when a ratio of a reflectivity at a first outermost off-axis deflection point on one side with respect to an on-axis deflection point on a deflecting surface of the deflecting unit to the reflectivity at the on-axis deflection point is represented by $\Delta R_1$, and a ratio of the reflectivity at a second outermost off-axis deflection point on the other side with respect to the on-axis deflection point on the deflecting surface to the reflectivity at the on-axis deflection point is represented by $\Delta R_2$, the following conditions are satisfied:

$1.05 \leq |\Delta R_1| \leq 1.50$; and $1.05 \leq |\Delta R_2| \leq 1.50$.

2. The light scanning apparatus according to claim 1, wherein the reflectivity on the deflecting surface increases from the on-axis deflection point toward the first outermost off-axis deflection point in the main scanning direction, and increases from the on-axis deflection point toward the second outermost off-axis deflection point in the main scanning direction.

3. The light scanning apparatus according to claim 1, wherein, when a ratio of a partial magnification at a first outermost off-axis image height corresponding to the first outermost off-axis deflection point to the partial magnification at the on-axis image height is represented by $\Delta Y_1$, and a ratio of the partial magnification at a second outermost off-axis image height corresponding to the second outermost off-axis deflection point to the partial magnification at the on-axis image height is represented by $\Delta Y_2$, the following conditions are satisfied:

$1.05 \leq |\Delta Y_1| \leq 1.50$; and $1.05 \leq |\Delta Y_2| \leq 1.50$.

4. The light scanning apparatus according to claim 3, wherein the partial magnification at each image height increases from the on-axis image height toward the first outermost off-axis image height in the main scanning direction, and increases from the on-axis image height toward the second outermost off-axis image height in the main scanning direction.

5. The light scanning apparatus according to claim 1, wherein, w % ben a ratio of a partial magnification at a first outermost off-axis image height corresponding to the first outermost off-axis deflection point to the partial magnification at the on-axis image height is represented by $\Delta Y_1$, and a ratio of the partial magnification at a second outermost off-axis image height corresponding to the second outermost off-axis deflection point to the partial magnification at the on-axis image height is represented by $\Delta Y_2$, the following conditions are satisfied:

$0.80 \leq |\Delta Y_1/\Delta R_1| \leq 1.20$; and $0.80 \leq |\Delta Y_2/\Delta R_2| \leq 1.20$.

6. The light scanning apparatus according to claim 1, comprising:
an incident optical system configured to cause the light flux to be incident on the deflecting unit,
wherein, when an angle between an optical axis of the incident optical system and an optical axis of the imaging optical system is represented by $\psi$ [radian], the following condition is satisfied:

$1.04 \leq |\psi| \leq 2.0$).

7. The light scanning apparatus according to claim 1, wherein, when, among the deflection points on the deflecting surface with respect to a principal ray of the respective on-axis light flux and off-axis light fluxes, an incident angle of the principal ray incident on the deflection point having the smallest reflectivity is represented by $\theta_{ex}$, the following condition is satisfied:

$0.34 \leq \theta_{ex}| \leq 1.14$.

8. The light scanning apparatus according to claim 1, wherein a width of the light flux incident on the deflecting surface is smaller than a width of the deflecting surface in a main scanning cross section.

9. The light scanning apparatus according to claim 1, wherein the deflecting surface is a surface in which a multilayer film is formed on a substrate.

10. The light scanning apparatus according to claim 9, wherein the substrate is a substrate formed by resin.

11. The light scanning apparatus according to claim 9, wherein the multilayer film includes, in order from the substrate side, a ground layer, a metal layer, a first low refractive index dielectric layer, a high refractive index dielectric layer and a second low refractive index dielectric layer, or includes, in order from the substrate side, the ground layer, the metal layer, a first high refractive index dielectric layer, a low refractive index dielectric layer and a second high refractive index dielectric layer.

12. The light scanning apparatus according to claim 11, wherein the low refractive index dielectric layer is a layer formed by at least one of silicon dioxide and magnesium fluoride.

13. The light scanning apparatus according to claim 11, wherein the high refractive index dielectric layer is a layer formed by at least one of tantalum pentoxide, niobium pentoxide, titanium dioxide, zirconium oxide, hafnium oxide and aluminum oxide.

14. The light scanning apparatus according to claim 1, wherein the deflecting unit is a polygon mirror.

15. An image forming apparatus comprising:
the light scanning apparatus according to claim 1:
a developing unit configured to develop, as a toner image, an electrostatic latent image formed on the scanned surface by the light scanning apparatus;
a transferring unit configured to transfer the developed toner image onto a transferred material; and
a fixing unit configured to fix the transferred toner image on the transferred material.

16. An image forming apparatus comprising:
the light scanning apparatus according to claim 1; and
a printer controller configured to convert a signal output from an external apparatus into image data to input the image data to the light scanning apparatus.

* * * * *